United States Patent
Tsuji et al.

(10) Patent No.: US 7,484,410 B2
(45) Date of Patent: Feb. 3, 2009

(54) GYRO SENSOR AND SENSOR APPARATUS USING SAME

(75) Inventors: Koji Tsuji, Suita (JP); Kazuo Gouda, Osaka (JP); Masao Kirihara, Kadoma (JP); Youichi Nishijima, Osaka (JP); Satoshi Hyodo, Ashiya (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 38 days.

(21) Appl. No.: 10/598,333

(22) PCT Filed: Mar. 14, 2005

(86) PCT No.: PCT/JP2005/004870

§ 371 (c)(1),
(2), (4) Date: Dec. 8, 2006

(87) PCT Pub. No.: WO2005/086597

PCT Pub. Date: Sep. 22, 2005

(65) Prior Publication Data

US 2008/0053224 A1    Mar. 6, 2008

(30) Foreign Application Priority Data

Mar. 12, 2004 (JP) ............................. 2004-071514
Nov. 25, 2004 (JP) ............................. 2004-341136

(51) Int. Cl.
*G01C 19/56* (2006.01)
*G01P 9/04* (2006.01)

(52) U.S. Cl. .................. 73/504.04; 73/504.12

(58) Field of Classification Search .............. 73/504.02, 73/504.04, 504.12, 504.14, 504.15
See application file for complete search history.

(56) References Cited

U.S. PATENT DOCUMENTS 5,559,291 A * 9/1996 Hasegawa ................. 73/504.12

(Continued)

FOREIGN PATENT DOCUMENTS

EP    0634629    1/1995

(Continued)

OTHER PUBLICATIONS

English Language Abstract of JP 2003-194545.

(Continued)

*Primary Examiner*—Helen C. Kwok
(74) *Attorney, Agent, or Firm*—Greenblum & Bernstein, P.L.C.

(57) ABSTRACT

Disclosed is a gyro sensor, which comprises a primary base plate (1) and a support base plate (2) which are superimposed on one another. The primary base plate (1) is provided with a driven mass body (11) to be driven in such a manner as to be vibrated in a direction intersecting with a surface of the support base plate (2), and a detection mass body (12) coupled with the driven mass body (11) through a drive spring (13) and adapted to be displaceable in a plane along the support base plate (2). Two detection springs (15) extending in the arranging direction of the driven mass body (11) and the detection mass body (12) are connected, respectively, to opposite side of the detection mass body (12), and the other ends of the detection springs (15) are connected together through a coupling segment (16). A fixing segment (17) provided at a longitudinally intermediate portion of the coupling segment (16) is fixed to the support base plate (2). A member formed by integrating the driven mass body (11) and the detection mass body (12) through the drive spring (13) is supported relative to the support base plate (2) by the detection springs (15) in a cantilever manner.

15 Claims, 25 Drawing Sheets

U.S. PATENT DOCUMENTS

| | | | | |
|---|---|---|---|---|
| 6,125,700 | A * | 10/2000 | Tsugai et al. | 73/504.12 |
| 6,915,693 | B2 * | 7/2005 | Kim et al. | 73/504.12 |
| 6,928,872 | B2 * | 8/2005 | Durante et al. | 73/504.04 |
| 6,978,673 | B2 * | 12/2005 | Johnson et al. | 73/504.12 |
| 6,988,408 | B2 * | 1/2006 | Cho | 73/504.14 |
| 7,059,190 | B2 * | 6/2006 | Sakai et al. | 73/514.32 |
| 2001/0002551 | A1 | 6/2001 | Kawai et al. | |

FOREIGN PATENT DOCUMENTS

| | | |
|---|---|---|
| JP | 6-281665 | 10/1994 |
| JP | 7-239339 | 9/1995 |
| JP | 11-2526 | 1/1999 |
| JP | 2001-082964 | 3/2001 |
| JP | 2003-194545 | 7/2003 |

OTHER PUBLICATIONS

English Language Abstract of JP 11-2526.
English Language Abstract of JP 6-281665.
English Language Abstract of JP 7-239339.
English Language Abstract of JP 2001-082964.

* cited by examiner

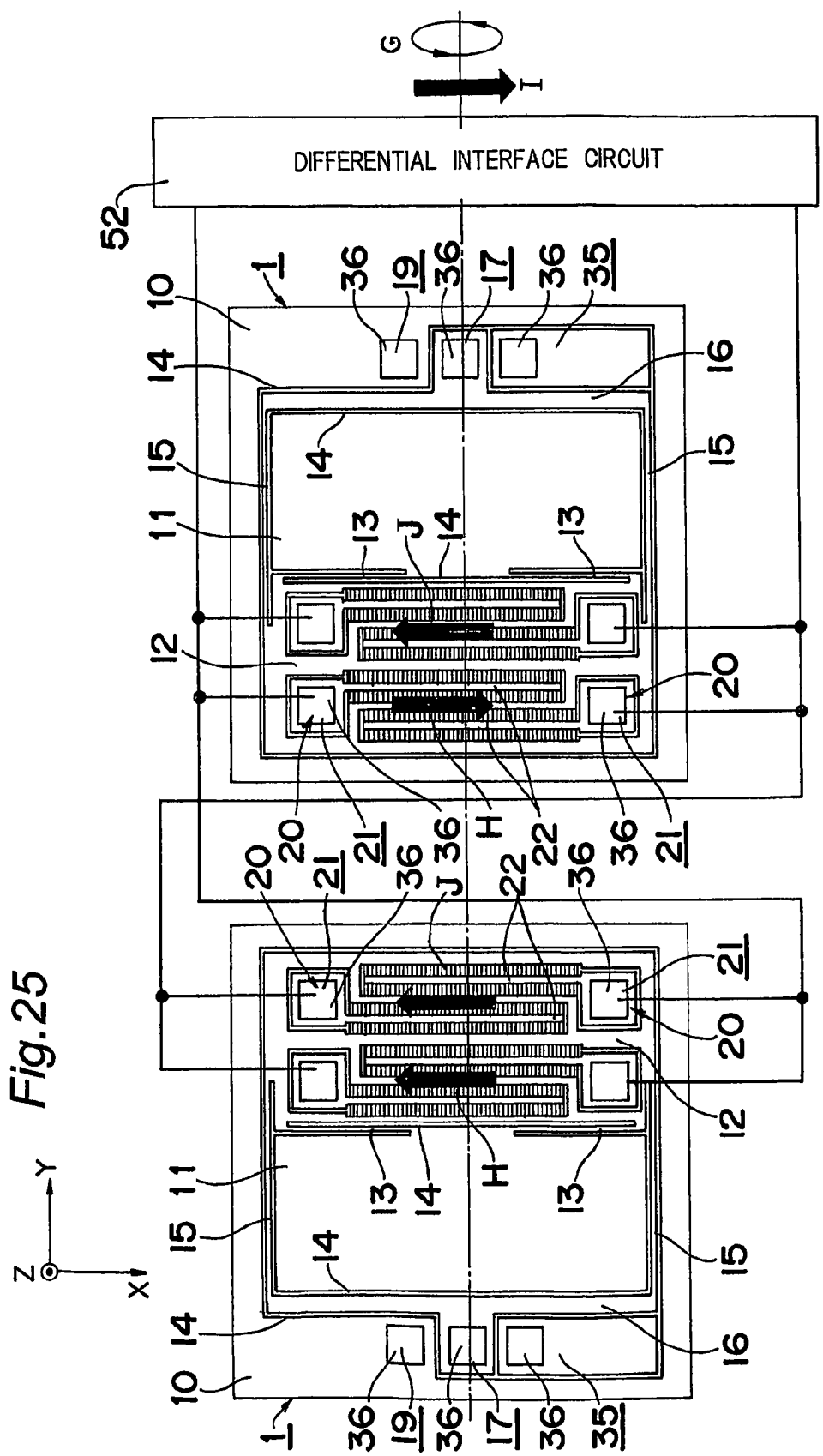

GYRO SENSOR AND SENSOR APPARATUS USING SAME

TECHNICAL FIELD

The present invention relates to a gyro sensor based on MEMS (Micro Electro Mechanical System) technologies, and a sensor apparatus using the gyro sensor.

BACKGROUND ART

In late years, a gyro sensor has been increasingly used in various systems and apparatuses, such as a suspension or airbag control system for automobiles, an inertial navigation system for airplanes and a blurring-correcting apparatus for cameras. This type of gyro sensor is operable, when an angular velocity due to an external force acts on a mass body which is being vibrated at a predetermined movement velocity, to measure a resulting Coriolis force so as to determine the angular velocity. Specifically, the Coriolis force is proportional to a vector product of the angular velocity caused by the external force and the movement velocity of the mass body, and thereby a value corresponding to the angular velocity can be derived from the measured Coriolis force and the known movement velocity of the mass body.

For example, as this type of gyro sensor, Japanese Patent Laid-Open Publication No. 2003-194545 discloses a gyro sensor provided with MEMSs and prepared through a semiconductor production process. The gyro sensor disclosed in the Japanese Patent Laid-Open Publication No. 2003-194545 is provided with a mass body to be driven in such a manner as to be vibrated in a Z-direction perpendicular to the surface of a drawing, and designed to measure an angular velocity acting in an X-direction which is one of the directions along the surface of the drawing. More specifically, as shown in FIG. 35, the gyro sensor comprises a rectangular frame-shaped driven mass body (first mass body) 62, a detection mass body (second mass body) 63 disposed on the inward side of the driven mass body 62, four first springs 64 attached, respectively, to the central portions of four edges of the driven mass body 62 and fixed to a support base plate (not shown), and four second springs 65 extending in the X-direction to connect between opposite ends of each of right and left edges of the driven mass body 62 and corresponding upper and lower edges of the detection mass body 63. Each of the upper and lower edges of the driven mass body 62 is provided with a driving electrode 66 to be applied with a drive voltage so as to vibrate the driven mass body 62 and the detection mass body 63 in the Z-direction. Further, each of the right and left edges of detection mass body 63 is provided with a horizontal detection electrode 67 for detecting a Y-directional displacement of the detection mass body 63 in accordance of change in electrostatic capacitance.

Thus, when an X-directional angular velocity acts on the driven mass body 62 under the condition that a drive voltage is being applied to the driving electrode 66 to continuously vibrate the driven mass body 62 and the detection mass body 63 in the Z-direction, the driven mass body 62 is displaced in the X-direction. The detection mass body 63 is connected to the driven mass body 62 through the second springs 65 extending in the X-direction. Thus, in conjunction with the X-directional displacement of the driven mass body 62, the detection mass body 63 is also displaced in the X-direction. Then, the second spring 65 is bent due to a Coriolis force generated in the detection mass body 63, and thereby the detection mass body 63 is displaced in the Y-direction. This Y-directional displacement of the detection mass body 63 can be measured based on an output of the horizontal detection electrode 67. Therefore, the Coriolis force can be calculated using the Z-directional vibration given to the driven mass body 62 and the output of the horizontal detection electrode 67, so as to allow a value corresponding to the angular velocity to be derived.

The Japanese Patent Laid-Open Publication No. 2003-194545 also discloses other arrangements, wherein one arrangement is designed such that the four first springs 64 are attached, respectively, to four corners of the driven mass body 62, and another arrangement is designed such that one end of each of the second springs 65 is fixed to the support base plate instead of the first springs 64, and the driven mass body 62 and the detection mass body 63 are connected to one another through the first springs 64. As the arrangement designed to fix one end of each of the second springs 56 to the support base plate, the Publication discloses one type in which the other end of the second spring 56 is connected to the detection mass body 63, and another type in which the other end of the second spring 56 is connected to the driven mass body 62.

In the gyro sensor disclosed in the Japanese Patent Laid-Open Publication No. 2003-194545, the driven mass body 62 and the detection mass body 63 are constrained from four sides by the first springs 64 and the second springs 65. Further, each of the driven mass body 62 and the detection mass body 63 is made from a semiconductor substrate, and the support base plate to be joined with the first springs 64 or the second springs 65 is typically made using a glass substrate. Thus, a thermal stress will be generated in the first springs 64 or the second springs 65 due to the difference between respective thermal expansion coefficients of the semiconductor substrate and the glass substrate causes, which leads to change in resonance frequency of the gyro sensor. The change in resonance frequency of the gyro sensor inevitably causes variation in detection value. Therefore, the gyro sensor disclosed in the Japanese Patent Laid-Open Publication No. 2003-194545 involves a problem about a relatively large temperature dependence of a detection value.

DISCLOSURE OF INVENTION

In view of the above circumstances, it is therefore an object of the present invention to provide a gyro sensor having a lowered temperature dependence of a detection value as compared to the conventional sensor, and a sensor apparatus using the gyro sensor.

A gyro sensor of the present invention comprises a primary base plate formed of a semiconductor substrate and provided with a detection mass body, a driven mass body and a detecting element. The detection mass body is displaceably supported relative to a support base plate in a plane along the support base plate through a detection spring having one end fixed to the support base plate. The driven mass body is connected to the detection mass body through a drive spring and adapted to be driven in such a manner as to be vibrated in a direction intersecting with the support base plate. The detecting element is adapted to detect a displacement amount of the detection mass body in the plane along the support base plate. In this gyro sensor, the detection spring extends from the detection mass body in only one direction along the support base plate so as to support the detection mass body relative to the support base plate in a cantilever manner.

According to the above gyro sensor, the detection spring which fixes the detection mass body and the driven mass body to the support base plate is disposed to extend from the detection mass body in only one direction so as to support the detection mass body in a cantilever manner. Thus, even if the primary base plate and the support base plate are different in thermal expansion coefficient, almost no thermal stress will act on the primary base plate, and thereby the gyro sensor will have almost no change in resonance frequency. This makes it possible to provide a lowered temperature dependence of a detection value.

Preferably, the gyro sensor of the present invention includes two of the detection springs each extending from the detection mass body in the above one direction and having flexibility in the displacement direction of the detection mass body, wherein respective distal ends of the detection springs are connected to one another continuously and integrally through a coupling segment which has rigidity and extends in the displacement direction of the detection mass body, and the coupling segment has an intermediate portion fixed to the support base plate.

According to this structure, the two detection springs are connected together through the coupling segment, and the coupling segment is fixed to the support base plate. Thus, the primary base plate can be fixed to the support base plate at a single position to facilitate an operation for joining between the primary base plate and the support base plate. In addition, the coupling segment connecting the two detection springs together is fixed to the support base plate. Thus, even if the primary base plate and the support base plate are different in thermal expansion coefficient, almost no thermal stress will act on the detection springs in an extension direction of the coupling segment. This makes it possible to provide a further lowered temperature dependence of a detection value.

In the gyro sensor of the present invention, it is preferable that the driven mass body and the detection mass body are disposed parallel to one another, and the drive spring is disposed between the driven mass body and the detection mass body and formed as a torsionally deformable torsion spring.

According to this structure, the drive spring formed as a torsion spring can be arranged in a space-saving manner as compared to a spring utilizing a bending deformation.

In the gyro sensor of the present invention, at least one of the driven mass body and the support base plate is preferably changed in thickness dimension to provide a greater distance therebetween at a position further away from the drive spring.

The driven mass body is vibrated about a fulcrum located at one end thereof on the side of the drive spring, and thereby a vibrational amplitude becomes larger at a position further away from the drive spring. Thus, according to the above structure, the distance between the driven mass body and the support base plate becomes greater at a position where the driven mass body has a larger vibrational amplitude to allow the vibrational amplitude of the driven mass body to be set at a relatively large value. Accordingly, the detection mass body can have a relatively large displacement amount in response to an angular velocity acting thereon, which leads to enhanced detection sensitivity to angular velocity.

In the gyro sensor of the present invention, either one of the driven mass body and the support base plate preferably has a driven-mass-body-protecting protrusion provided in a protruding manner thereon to regulate a maximum vibrational amplitude of the driven mass body.

According to this structure, the maximum vibrational amplitude of the driven mass body can be regulated. Thus, even if an impact force acts on the driven mass body due to dropping of the gyro sensor or the like, it can be expected to provide an effect of being able to prevent damages of the drive spring and/or the detection spring due to increase in displacement amount of the driven mass body.

In the gyro sensor of the present invention, it is preferable that the detecting element includes a plurality of movable comb-tooth segments each provided in a protruding manner on the inner peripheral surface of a cutout hole formed in the detection mass body, and a plurality of stationary comb-tooth segments each provided in a protruding manner on the outer peripheral surface of a stationary member disposed within the cutout hole and in opposed relation to a corresponding one of the movable comb-tooth segments.

According to this structure, the movable comb-tooth segment and the stationary comb-tooth segment each provided in a plural number allows the electrostatic capacitance value therebetween to be changed relatively largely in response to the displacement of the detection mass body so as to provide enhanced accuracy in detecting the displacement of the detection mass body.

In the gyro sensor of the present invention, it is preferable that the detecting element is adapted to detect the displacement amount of the detection mass body in accordance with change in electrostatic capacitance between the movable comb-tooth segments and the stationary comb-tooth segments, and the detecting element includes a capacitance-adjusting electrode which is disposed in opposed relation to the detection mass body in the displacement direction of the detection mass body, and adapted to adjust an electrostatic capacitance value between the movable comb-tooth segments and the stationary comb-tooth segments by means of an electrostatic force to be generated between the capacitance-adjusting electrode and the detection mass body in response to a voltage applied therebetween.

According to this structure, even if the distance and/or the facing area between the movable comb-tooth segments and the stationary comb-tooth segments have variations in each gyro sensor, the electrostatic capacitance value between the movable comb-tooth segments and the stationary comb-tooth segments can be uniformed to obtain desirably enhanced accuracy of the gyro sensor.

In the gyro sensor of the present invention, it is preferable that the detection mass body and the driven mass body are separated from one another by a slit groove penetrating the primary base plate in its thickness direction, and the slit groove is set to have an even width dimension.

According to this structure, in an operation for forming the slit groove in the primary base plate by an etching process, the difference in etching rate can be minimized. Thus, a penetration time of the slit groove can be readily adjusted. This makes it possible to suppress undesirable etching to the support base plate after the penetration, and prevent the occurrence of side etching due to a locally increased thermal resistance caused by etching. Accordingly, the primary base plate can be formed with relatively high accuracy to obtain desirably enhanced accuracy in detecting the angular velocity.

Preferably, the gyro sensor of the present invention includes a stationary driving electrode which is disposed on a surface of the support base plate opposed to the driven mass body, and adapted to vibrate the driven mass body by means of an electrostatic force to be generated between the driven mass body and the stationary driving electrode in response to a vibration voltage applied therebetween.

According to this structure, each of the detection spring, the detection mass body and the driven mass body provided in the primary base plate is used as an electrical pathway. Thus, a vibration voltage for vibrating the driven mass body can be applied only by forming the stationary driving electrode onto the support base plate. This provides a simplified structure which leads to downsizing of the gyro sensor.

Preferably, the gyro sensor of the present invention includes a stationary driving electrode which is disposed on a surface of the support base plate opposed to the driven mass body in such a manner that it is divided into two pieces at an intermediate position of the surface in the displacement direction of the detection mass body, and adapted to vibrate the driven mass body by means of electrostatic forces to be generated between the driven mass body and respective ones of the divided pieces in response to two types of vibration voltages applied, respectively, therebetween, wherein the vibration voltages have opposite polarities and the same absolute value.

According to this structure, two types of charges having opposite polarities and the same number are constantly generated in the driven mass body so that the potential of the drive driven mass body is kept at a constant value during the period where the driven mass body is vibrated. This suppresses the change in resonance frequency of the gyro sensor due to potential change in the driven mass body so as to maintain the accuracy in detecting the angular velocity.

Preferably, the gyro sensor of the present invention includes a distance-adjusting electrode which is disposed on the surface of the support base plate opposed to the driven mass body and in adjacent relation to the stationary driving electrode, and adapted to adjust a distance between the driven mass body and the stationary driving electrode by means of an electrostatic force to be generated between the driven mass body and the stationary driving electrode in response to a voltage applied therebetween.

According to this structure, even if the distance between the driven mass body and the stationary driving electrode has variations in each gyro sensor, the distance between the driven mass body and the stationary driving electrode can be uniformed value to obtain desirable enhanced accuracy of the gyro sensor.

Preferably, the gyro sensor of the present invention includes a ground wiring which is disposed around the stationary driving electrode in the support base plate and set at a ground potential.

According to this structure, noises to be radiated, particularly, to the detection mass body, can be reduced, which leads to enhanced accuracy in detecting the angular velocity.

In the gyro sensor of the present invention, the stationary driving electrode is preferably formed on the support base plate except for a region thereof opposed to a region of the driven mass body where a vibrational amplitude is to be maximized.

According to this structure, even if the vibration amplitude of the driven mass body is increased, and the region of the driven mass body having the maximum vibrational amplitude is brought into contact with the support base plate, the driven mass body and the stationary driving electrode will never be short-circuited.

In the gyro sensor of the present invention, it is preferable that the support base plate has a plurality of through-holes penetrating therethrough in its thickness direction, and each of the through-holes has an inner peripheral surface formed with an electrode wiring which consists of a conductive metal thin film and allows the primary base plate to be electrically connected to an external circuit.

According to this structure, each component of the primary base plate is electrically connected to the external circuit through the electrode wiring formed on each inner peripheral surface of the through-holes provided in the support base plate. This eliminates the need for laying out wirings for electrically connecting the components of the primary base plate to the external circuit. Accordingly, the support base plate can have a relatively small occupied area, which leads to downsizing of the gyro sensor.

In the gyro sensor of the present invention, it is preferable that the support base plate has a plurality of through-holes penetrating therethrough in its thickness direction, and each of the through-holes has an electrode wiring which consists of a conductive material filled in the through-hole and allows the primary base plate to be electrically connected to an external circuit.

According to this structure, each component of the primary base plate is electrically connected to the external circuit through the electrode wiring filled in each of the through-holes provided in the support base plate. This eliminates the need for laying out wirings for electrically connecting the components of the primary base plate to the external circuit. Accordingly, the support base plate can have a relatively small occupied area, which leads to downsizing of the gyro sensor. In addition, as compared with the electrode wiring consisting of a conductive metal thin film, the electrode wiring consisting of the conductive material filled in the through-hole allows each component of the primary base plate to be electrically connected to the external circuit with higher reliability.

In the gyro sensor of the present invention, it is preferable that the stationary driving electrode is disposed on the surface of the support base plate opposed to the driven mass body, and the stationary driving electrode and the electrode wiring are concurrently in contact with the primary base plate and electrically connected to one another through the primary base plate joined to the support base plate.

According to this structure, the stationary driving electrode and the electrode wiring are electrically connected to one another through the primary base plate. This eliminates the need for laying out a wiring for electrically connecting the stationary driving electrode to the electrode wiring. Accordingly, the support base plate can have a relatively small occupied area, which leads to downsizing of the gyro sensor.

In the gyro sensor of the present invention, in the state after the primary base plate and the support base plate are joined together, a support-base plate-side stress relaxation concave portion is preferably formed in a region of the support base plate which sandwiches the stationary driving electrode in cooperation with the primary base plate, to increase the distance relative to the primary base plate.

According to this structure, in the state after the primary base plate and the support base plate are joined together, a space corresponding to the support-base plate-side stress relaxation concave portion is created between the primary base plate and the support base plate, and the stationary driving electrode is disposed within this space. Thus, a distortion to be generated in respective regions of the primary base plate and the support base plate which sandwich the stationary driving electrode therebetween can be suppressed at a relatively small value. This provides an effect of being able to prevent the accuracy in detecting the angular velocity from deteriorating due to a stress arising from this distortion and acting on the detection spring, so as to maintain an adequate accuracy in detecting the angular velocity.

In the gyro sensor of the present invention, in the state after the primary base plate and the support base plate are joined together, the primary base plate preferably has a primary-base plate-side stress relaxation concave portion formed in a region thereon in contact with the stationary driving electrode, to increase the distance relative to the support base plate.

According to this structure, in the state after the primary base plate and the support base plate are joined together, a space corresponding to the primary-base plate-side stress relaxation concave portion is created between the primary base plate and the support base plate, and the stationary driving electrode is disposed within this space. Thus, a distortion to be generated in respective regions of the primary base plate and the support base plate which sandwich the stationary driving electrode therebetween can be suppressed at a relatively small value. This provides an effect of being able to prevent the accuracy in detecting the angular velocity from deteriorating due to a stress arising from this distortion and acting on the detection spring, so as to maintain an adequate accuracy in detecting the angular velocity. In addition, the primary base plate formed of a semiconductor substrate allows the primary-base plate-side stress relaxation concave portion to be readily formed therein by an etching process.

In the gyro sensor of the present invention, a region of the primary base plate which is in contact with the stationary driving electrode in the state after it is joined to the support base plate, is preferably connected to a different region of the primary base plate through a stress relaxation spring.

According to this structure, a stress arising from a distortion to be generated in the region of the primary base plate in contact with the stationary driving electrode is relaxed by the stress relaxation spring. This provides an effect of being able to prevent the accuracy in detecting the angular velocity from deteriorating due to the stress acting on the detection spring, so as to maintain an adequate accuracy in detecting the angular velocity.

In the gyro sensor of the present invention, the driven mass body has a thickness dimension greater than that of the detection mass body.

According to this structure, the difference between respective masses of the driven mass body and the detection mass body can be increased to allow the driven mass body to have a greater mass than that of the detection mass body so as to obtain enhanced sensitivity.

In the gyro sensor of the present invention, the driven mass body preferably has a through-hole penetrating therethrough in a vibration direction thereof.

According to this structure, a damping during the vibration of the driven mass body can be reduced to provide enhanced mechanical Q value in the vibration direction of the driven mass body. Accordingly, the driven mass body can have a relatively large vibrational amplitude, and thereby the detection mass body can have a relatively large displacement amount when an angular velocity acts thereon, which leads to enhanced detection sensitivity to angular velocity.

In the gyro sensor of the present invention, the above through-hole has a strip-shaped opening elongated in the displacement direction of the detection mass body.

According to this structure, a damping during the period where the driven mass body is displaced in the displacement direction of the detection mass body can be reduced to allow the detection mass body to have a relatively large displacement amount when an angular velocity acts thereon, which leads to enhanced detection sensitivity to angular velocity.

In the gyro sensor of the present invention, the above through-hole is preferably formed in a tapered shape whose sectional area along a plate surface of the primary base plate becomes smaller at a position further away from the support base plate.

Generally, the mechanical Q value of the driven mass body is lowered as the mass of the driven mass body is reduced. According to this structure, the decrease in mass of the driven mass body to be caused by forming the through-hole can be suppressed at a relatively small value. Thus, even if the through-hole is formed, the decrease in mechanical Q value of the driven mass body due to decrease in mass can be suppressed at a relatively small value. This makes it possible to suppress the reduction in vibrational amplitude of the driven mass body so as to maintain adequate detection sensitivity to angular velocity.

In the gyro sensor of the present invention, the surface of the support base plate opposed to the detection mass body is preferably formed with a stress relaxation groove having a strip-shaped opening elongated in the displacement direction of the detection mass body.

According to this structure, even if the support base plate and the primary base plate are different in thermal expansion coefficient, a thermal stress to be generated in the width direction of the stress relaxation groove can be relaxed by the change in width dimension of the stress relaxation groove, and thereby an internal stress in the support base plate can be reduced. This leads to an effect of being able to suppress the change in resonance frequency due to a thermal stress generated in the drive spring, and prevent the accuracy in detecting the angular velocity from being changed by temperature variations.

The above stress relaxation groove includes two types: one type in which the groove penetrates through the support base plate in its thickness direction, and the other type in which the groove does not penetrate therethrough.

In the gyro sensor of the present invention, it is preferable that the primary base plate is provided with a frame fixed to the support base plate in such a manner as to surround around the driven mass body and the detection mass body, and either one of the detection mass body and the frame has a detection-mass-body-protecting protrusion provided in a protruding manner thereon to regulate a maximum displacement amount of the detection mass body.

According to this structure, the maximum displacement amount of the detection mass body is regulated. Thus, even if an impact force acts on the detection mass body due to dropping of the gyro sensor or the like, it can be expected to provide an effect of being able to prevent damages of the detection spring due to increase in displacement amount of the detection mass body.

In the gyro sensor of the present invention, it is preferable that the primary base plate is provided with an acceleration-detecting electrode which is disposed in a plane along the support base plate and in opposed relation to the driven mass body with a given distance in a direction orthogonal to the displacement direction of the detection mass body, and the acceleration-detecting electrode is operable in cooperation with the driven mass body to serve as an acceleration detector for detecting a displacement amount of the driven mass body in the direction orthogonal to the displacement direction of the detection mass body in the plane along the support base plate.

According to this structure, the displacement amount of the driven mass body in the direction orthogonal to the displacement direction of the detection mass body in the plane along the support base plate can be detected. This makes it possible to detect an acceleration value acting in the above direction.

A sensor apparatus of the present invention comprises either two of the aforementioned gyro sensors, and a signal processing section adapted to drive the gyro sensors in such a manner that the respective driven mass bodies of the gyro sensors are vibrated in opposite directions, and to output the difference between respective outputs of the gyro sensors.

According to the above sensor apparatus, the respective driven mass bodies of the gyro sensors are vibrated in opposite directions. Thus, when an angular velocity acts thereon, the respective outputs of the gyro sensors have opposite polarities, and thereby the signal processing section has an output two times greater than that from each of the gyro sensors. When an acceleration acts thereof in one direction, the respective detection mass bodies of the gyro sensors are displaced in the same direction and at the same amount. Thus, the respective outputs of the gyro sensors become equal to one another, and thereby the output of the signal processing section becomes zero. This provides an advantage of being able to provide two times higher sensitivity to angular velocity as compared to each of the gyro sensors, and being less susceptible to an acceleration acting in one direction.

According to the present invention, the detection spring which fixes the detection mass body and the driven mass body to the support base plate is disposed to extend from the detection mass body in only one direction so as to support the detection mass body in a cantilever manner. Thus, even if the primary base plate and the support base plate are different in thermal expansion coefficient, almost no thermal stress will act on the primary base plate, and thereby the gyro sensor will have almost no change in resonance frequency. This provides an advantage of being able to achieve a lowered temperature dependence of a detection value.

BRIEF DESCRIPTION OF DRAWINGS

A better understanding of the present invention can be obtained when the following detailed description of the preferred embodiment is considered in conjunction with the accompanying drawings. In the accompanying drawings, a common component or element is defined by the same reference numeral or code.

FIG. 25 is an explanatory view showing the connection in a sensor apparatus according to a seventh embodiment of the present invention.

BEST MODE FOR CARRYING OUT THE INVENTION

This application is based upon and claims the benefit of priority from the prior Japanese Patent Application No. 2004-71514 and No. 2004-341136, filed in Japan; the entire contents of which are incorporated herein by reference. With reference to the accompanying drawings, an embodiment of the present invention will now be specifically described.

First Embodiment

Figure 1:
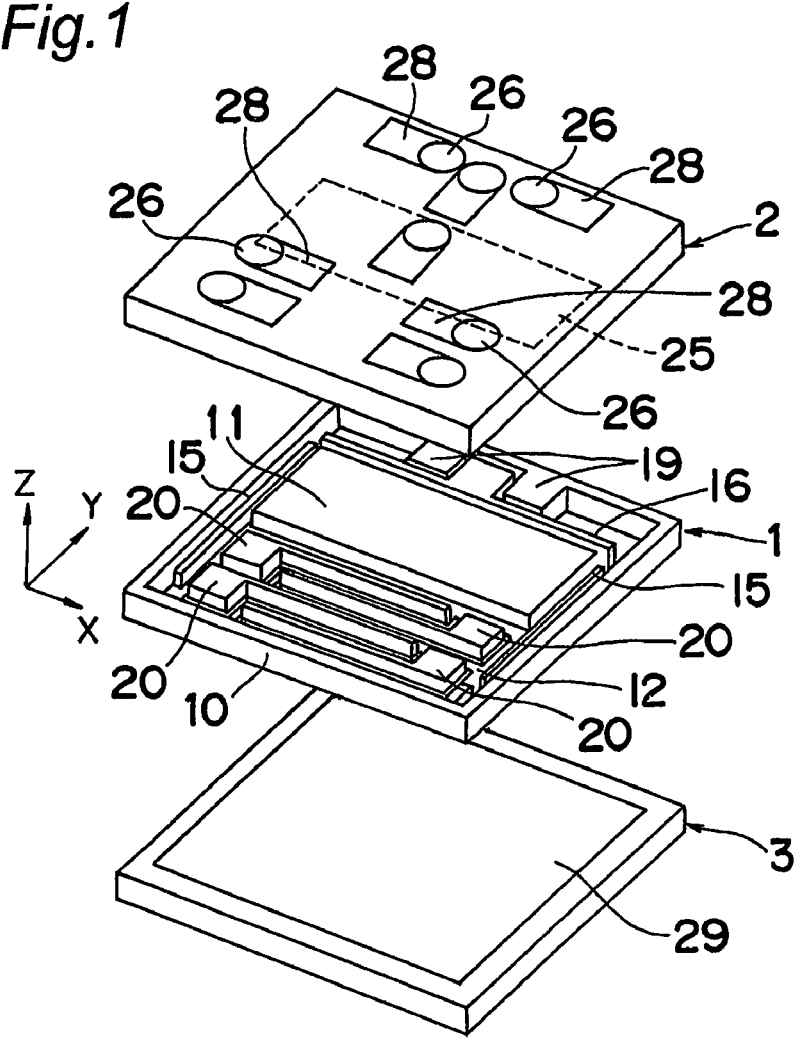
FIG. 1 is an explored perspective view showing a gyro sensor according to a first embodiment of the present invention.
Figure 2:
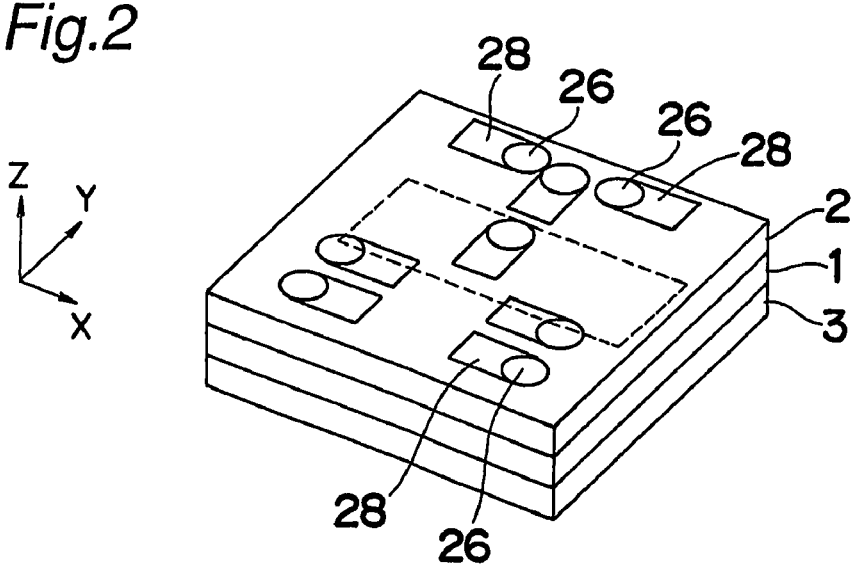
FIG. 2 is a perspective view of the gyro sensor in FIG. 1.

As shown in FIGS. 1 and 2, a gyro sensor according to a first embodiment of the present invention has a three-layer structure comprising a primary base plate 1 formed of a silicon substrate, a support base plate 2 formed of a glass substrate and superimposed on one surface of the primary base plate 1, and a cap 3 formed of a glass substrate superimposed on the other surface of the primary base plate 1. Each of the support base plate 2 and the cap 3 is joined to the primary base plate 1, for example, by an anodic bonding process. The primary base plate 1 may be made using any suitable semiconductor material other than silicon.

Figure 3:
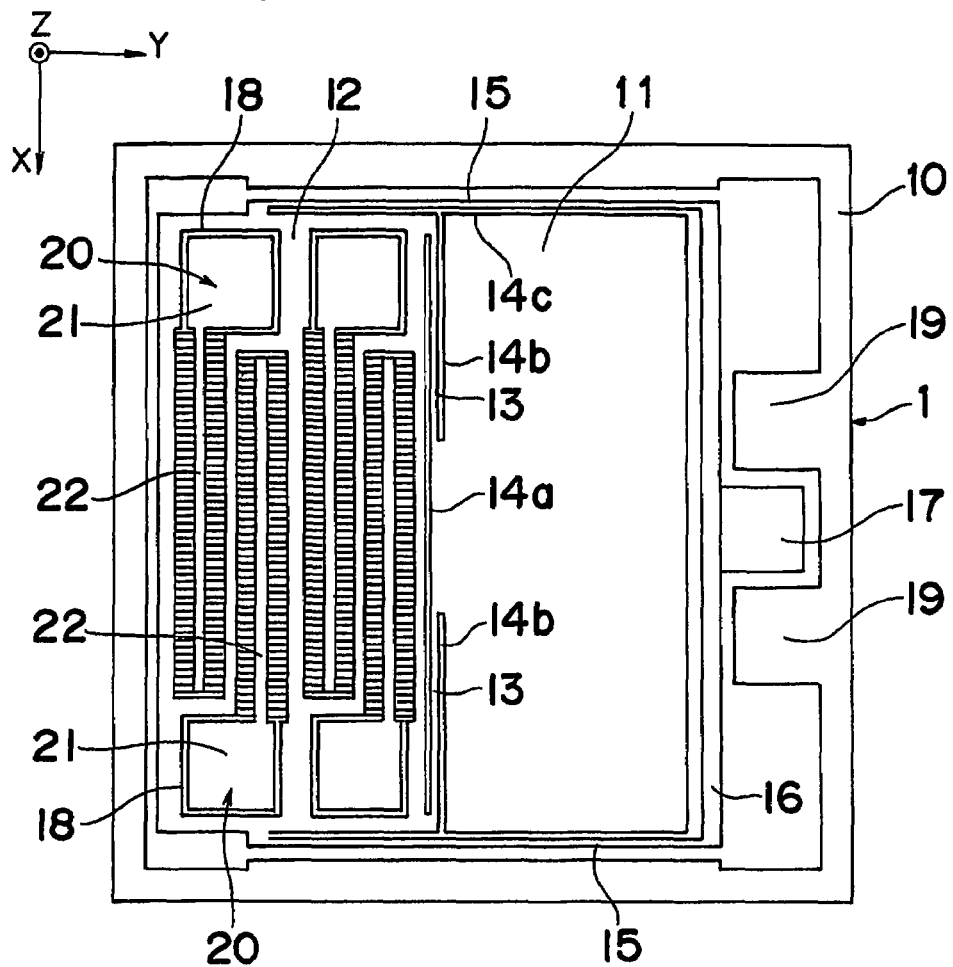
FIG. 3 is a top plan view showing a primary base plate for use in the gyro sensor in FIG. 1.

As shown in FIG. 3, the primary base plate 1 includes a driven mass body 11 and a detection mass body 12 which are formed in a rectangular shape in top plan view and disposed in parallel to one another along a plate surface of the primary base plate 1. The primary base plate 1 further includes a rectangular-shaped frame 10 surrounding around the driven mass body 11 and the detection mass body 12. Thus, in the state after the support base plate 2 and the cap 3 are joined to the primary base plate 1, the driven mass body 11 and the detection mass body 12 are hermetically contained in a space surrounded by the support base plate 2, the cap 3 and the frame 10. In the following description, a direction along which the driven mass body 11 and the detection mass body 12 are aligned is defined as a Y-direction, and a direction orthogonal to the Y-direction in a plane along the plate surface of the primary base plate 1 is defined as an X-direction. Further, a direction orthogonal to both the X-direction and the Y-direction or to the plate surface of the primary base plate 1 is defined as a Z-direction.

The driven mass body 11 and the detection mass body 12 are connected to one another continuously and integrally through a pair of drive springs 13 each extending in the X-direction. More specifically, the primary base plate 1 is formed with a slit groove 14a having a length slightly less than the entire length of the detection mass body 12 in the X-direction, and two slit grooves 14b aligned on a straight line extending in the X-direction, in such a manner that one end, or first end, of each slit grooves 14b is opened to a corresponding one of X-directionally opposed edges of the driven mass body 11. Each of the drive springs 13 is formed between the slit groove 14a and each of the slit grooves 14a. One end, or first end, of each of the drive springs 13 is connected to a region between one of opposite ends of the slit groove 14a and a corresponding edge of the detection mass body 12, and the other end, or second end, of each of the drive springs 13 is connected to the driven mass body 11 through a region between respective second ends of the two slit grooves 14b. Each of the drive springs 13 is formed as a torsionally deformable torsion spring, and thereby the driven mass body 11 is displaceable relative to the detection mass body 12 around the drive springs 13. In other words, the driven mass body 11 is designed to be translationally movable in the Z-direction and rotatable around an X-directional axis, relative to the detection mass body 12. The drive springs 13 formed as a torsion spring can eliminate the need for reducing the dimension of the drive springs 13 in the thickness direction of the primary base plate 1 to facilitate a process for forming the drive springs 13.

Each of a pair of detection springs 15 extending in the Y-direction has one end, or first end, connected to a corresponding one of X-directionally opposed edges of the detection mass body 12, and respective second ends of the detection springs 15 are connected to one another continuously and integrally through a coupling segment 16 extending in the X-direction. That is, a member having a reverse C shape in top plan view is formed by the pair of detection springs 15 and the coupling segment 16. The coupling segment 16 is designed to have a sufficiently higher rigidity than those of the drive springs 13 and detection springs 15. A fixing segment 17 is provided in a protruding manner in a longitudinally intermediate portion of the coupling segment 16A. The fixing segment 17 is joined to the support base plate 2, and fixed at a given position. The driven mass body 11 and the detection mass body 12 are separated from the detection springs 12 and the coupling segment 16 by a reverse C-shaped slit groove 14c, and the respective first ends of the slit grooves 14b are connected to the slit groove 14c. Each of the detection springs 15 is bendably deformed in the X-direction to allow the driven mass body 11 and the detection mass body 12 to be displaced relative to the fixing segment in the X-direction.

Figure 4:
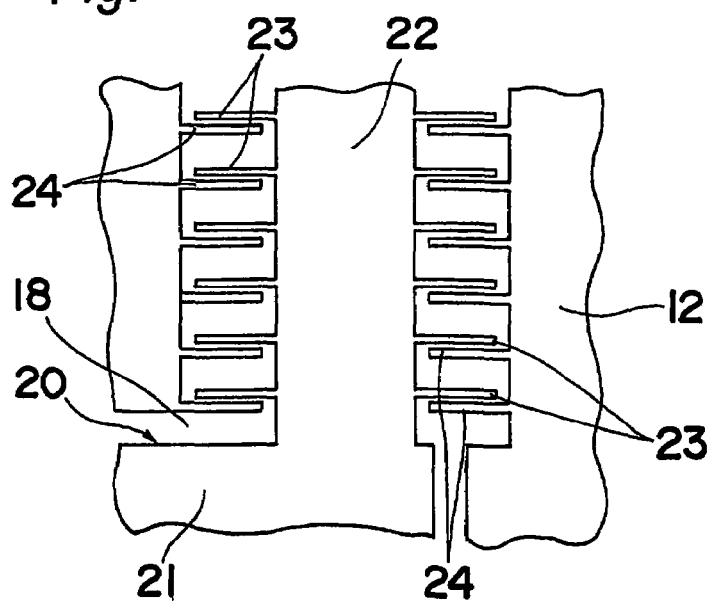
FIG. 4 is a fragmentary top plan view showing a primary base plate for use in the gyro sensor in FIG. 1.

The detection mass body 12 has four cutoff holes 18 penetrating therethrough in its thickness direction, and four stationary members 20 are disposed, respectively, within the cutout holes 18. Each of the stationary members 20 has an electrode segment 21 disposed in the vicinity of one of the X-directionally opposed ends of the detection mass body 12, and a comb-skeleton segment 22 extending from the electrode segment 21 in the X-direction. The electrode segment 21 and the comb-skeleton segment 22 have an L shape in there entirety. The electrode segment 21 and the comb-skeleton segment 22 are joined to the support electrode 2 to fix the stationary member 20 at a given position. The cutout hole 10 has an inner peripheral surface along the shape of the outer peripheral surface of the stationary member 20, and a certain space or gap is formed between the stationary member 20 and the inner peripheral surface of the cutout hole 10. Two of the electrode segments 21 are disposed at each of the X-directionally opposed ends of the detection mass body 12. A number of stationary comb-tooth segments 23 are provided on each of width-directionally opposed edges of the comb-skeleton segments 22 and disposed parallel to each other in the X-direction. Further, a number of movable comb-tooth segments 24 are provided on an inner surface of the cutout hole 18 opposed to the comb-skeleton segment 22 and disposed parallel to each other in the X-direction and in opposed relation to the corresponding stationary comb-tooth segments 23, as shown in FIG. 4. The stationary comb-tooth segments 23 and the corresponding movable comb-tooth segments 24 are designed such that they are spaced apart from each other, and the change in electrostatic capacitance caused by the change in distance between the stationary comb-tooth segments 23 and the corresponding movable comb-tooth segments 24 in response to the displacement of the detection mass body 12 in the X-direction is detected. That is, the stationary comb-tooth segments 23 and the corresponding movable comb-tooth segments 24 serve as detection means for detecting the displacement of the detection mass body 12.

Figure 5:
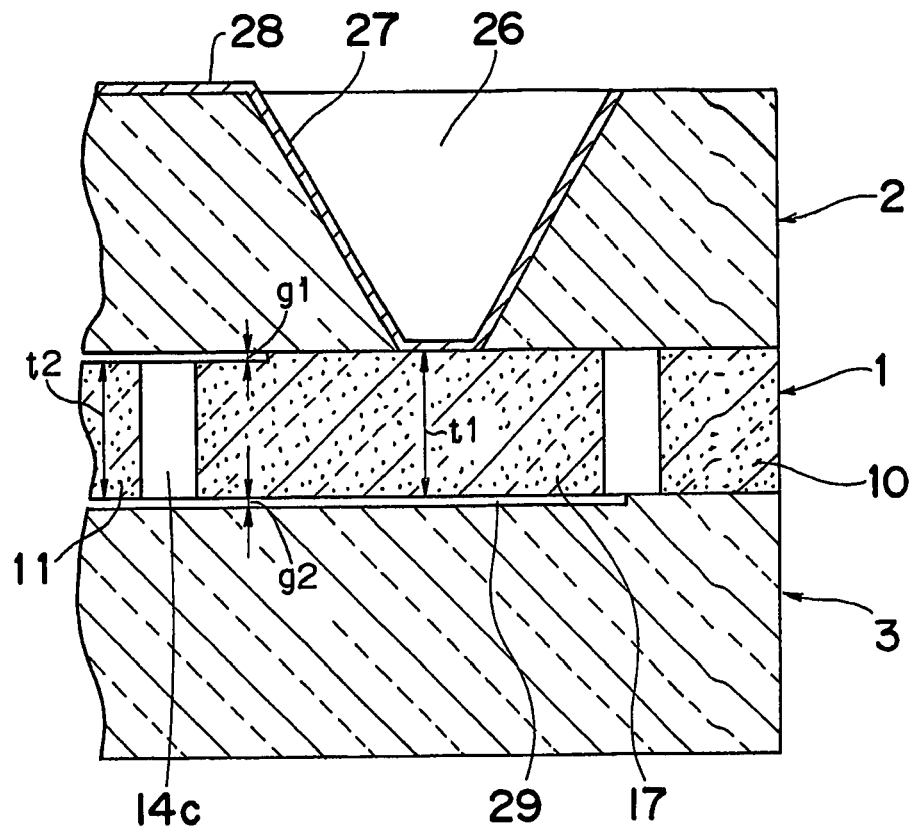
FIG. 5 is a fragmentary sectional view of the gyro sensor in FIG. 1.

The support base plate 2 and the cap 3 are joined to the frame 10 provided in the primary base plate 1, and the fixing segment 17 and the stationary members 20 are joined to the support base plate 2. By way of exception, the driven mass body 11 and the detection mass body 12 is essentially designed to be displaceable in Z-direction within a gap to be formed between the support base plate 2 and the cap 3. Thus, as shown in FIG. 5, respective surface regions of the driven mass body 11 and the detection mass body 12 opposed to the support base plate 2 are located away from the support base plate 2 to assure a gap g1, and a concave portion 29 is formed in a surface of the cap 3 opposed to the primary base plate 1 to assure a gap g2 between the cap 3 and each of the driven mass body 11 and the detection mass body 12. Each of the gaps g1, g2 is set in the range of several μm and ten and several μm, for example at 10 μm. In this case, the fixing segment 17 is set to have a thickness dimension t1 of 300 μm, and the driven mass body 11 is set to have a thickness dimension t2 of 290 µm. Instead of changing the thickness dimension of the primary base plate 1, a concave portion may be formed in a region of the support base plate 2 opposed to the driven mass body 11 and the detection mass body 12. In essence, the gap g1 between respective opposed surfaces of the driven mass body 11 and the support base plate 2a may be assured by forming any suitable shape allowing one of the driven mass body 11 and the support base plate 2 to be located away from the other.

A stationary driving electrode 25 (see FIG. 1) consisting of a thin film made of conductive metal, such as aluminum, is formed on a surface region of the support base plate 2 opposed to the driven mass body 11. Further, a through-hole 26 is formed in each of regions of the support base plate 2 corresponding to the fixing segment 17, the electrode segments 21 of the stationary members 20, and the stationary driving electrode 25. In the illustrated embodiment, a pair of ground segments 19 is formed in a region of the frame 10 adjacent to the fixing segment 17 in such a manner as to sandwich the fixing segment 17 therebetween, and an additional through-hole 26 is formed in a region of the support base plate 2 corresponding to each of the ground segments 19. As shown in FIG. 5, an electrode wiring 27 consisting of a thin film made of conductive metal, such as aluminum, is formed on the inner peripheral surface of each of the through-hole 26. Each of the through-hole 26 has a tapered shape having an inner diameter which becomes smaller at a position closer to the primary base plate 1. The electrode wiring 27 is formed to cover a surface of the primary base plate 1 in addition to each inner peripheral surface of the through-holes 26. Specifically, one open end of each of the through-holes 26 is closed by the electrode wiring 27 in such a manner that the electrode wiring 27 is electrically connected to each component of the primary base plate 1. A part of the electrode wiring 27 extends to a front surface (a surface on the opposite side of the primary base plate 1) of the support base plate 2. The part of the electrode wiring 27 extending to the front surface of the support base plate 2 serves as an electrode pad 28. In this manner, the electrode wiring 27 consisting of a metal thin film similar to that to be obtained by a through-hole plating process is formed on each inner peripheral surface of the through-holes 26 formed in the support base plate 2 to connect the electrode pad 28 and each component formed on the primary base plate 1, in the thickness direction of the support base plate 2. Thus, each component of the primary base plate 1 can be connected to an external circuit without laying out wirings on the primary base plate 1, which leads to downsizing of the base plate.

In a process for producing the above gyro sensor, the primary base plate 1 is first joined to the support base plate 2 formed with the through-holes 26. In this state, the components (the frame 10, the driven mass body 11, the detection mass body 12, the stationary members 20) are not separated from each other. Thus, after joining the primary base plate 1 to the support base plate 2, the groove for separating the frame 10, the slit grooves 14a to 14c and the grooves for separating the stationary members 20 are formed in a surface of the primary base plate 1 opposed to the cap 3 to separate the components from each other. In this stage, the fixing segment 17 is joined to the support base plate 2, and thereby the driven mass body 11 and the detection mass body 12 are held by the support base plate 2 because they are connected to the fixing segment 17. Further, the stationary members 20 are also joined to the support base plate 2. Then, when the cap 3 is joined to the primary base plate 1, the driven mass body 11 and the detection mass body 12 are hermetically contained in a space surrounded by the support base plate 2, the cap 3 and the frame 10. Then, the electrode wiring 27 is formed in each inner peripheral surface of the through-holes 26 of the support base plate 2, and the electrode pad 28 is formed. Through this process, the above gyro sensor is produced.

An operation of the gyro sensor according to the first embodiment will be described below. As mentioned in connection with the conventional gyro sensor, this gyro sensor is also operable to detect the displacement of the detection mass body 12 when an angular velocity due to an external force acts thereon under the condition that the driven mass body 11 is being vibrated in given parameters. A sinusoidal or rectangular-wave vibration voltage may be applied between the stationary driving electrode 25 and the driven mass body 11 to vibrate the driven mass body 11. While it is preferable to use an AC voltage, it is not essential to invert polarity. The driven mass body 11 is electrically connected to the fixing segment 17 through the drive springs 13, the detection mass body 12, the detection springs 15 and the coupling segment 16, and the support base plate 2 is formed with the through-holes 26 in the regions thereof corresponding to the fixing segment 17 and the stationary driving electrode 25. Thus, a vibration voltage can be applied to the electrode wirings 27 corresponding to the two through-holes 26, to generate an electrostatic force between the driven mass body 11 and the stationary driving electrode 25 so as to vibrate the driven mass body 11 relative to the support base plate 2 and the cap 3 in the Z-direction. The vibration voltage may be adjusted to have a frequency identical to a resonance frequency determined by the masses of the driven mass body 11 and the detection mass body 12, and the spring constants of the drive springs 13 and the detection springs 15, so as to allow a large vibrational amplitude to be obtained by a relatively small driving force.

When an angular velocity around the Y-directional axis acts on the primary base plate 1 under the condition that the driven mass body 11 is being vibrated, a Coriolis force is generated in the X-direction, and thereby the detection mass body 12 (and the driven mass body 11) is displaced relative to the stationary members 20 in the X-direction. Thus, the movable comb-tooth segments 24 are displaced relative to the stationary comb-tooth segments 23, and thereby the distance between the movable comb-tooth segments 24 and the stationary comb-tooth segments 23 is changed. Accordingly, the electrostatic capacitance between the movable comb-tooth segments 24 and the stationary comb-tooth segments 23 is changed. This change in electrostatic capacitance can be picked up from the electrode wirings 27 connected to the four stationary members 20. Specifically, the electrostatic capacitance between each pair of electrode segments 21 aligned in the X-direction reflects the change in distance between the stationary comb-tooth segments 23 and the movable comb-tooth segments 24, and the pair of electrode segments 21 are equivalent to electrodes of a variable capacitor. That is, the illustrated embodiment includes four variable capacitors. Thus, the displacement of the detection mass body 12 can be determined by detecting each electrostatic capacitance of the variable capacitors or detecting the combined capacitance of the variable capacitors connected in parallel with one another. The vibration parameters of the driven mass body 11 are known, and thereby the Coriolis force can be determined by detecting the displacement of the detection mass body 12.

The displacement of the movable comb-tooth segments 24 is proportional to (the mass of the driven mass body 11)/(the mass of the driven mass body 11+the mass of the detection mass body 12). Thus, when the mass of the driven mass body 11 has a larger value as compared to the mass of the detection mass body 12, the displacement of the movable comb-tooth segments 24 will be increased to provide enhanced sensitivity. For this reason, in the first embodiment, the thickness dimension of the driven mass body 11 is set about two times greater than that of the detection mass body 12. For example, when the thickness dimension t2 (see FIG. 5) of the driven mass body 11 is set at 290 μm, as described above, it is desirable to set the thickness dimension of the detection mass body 12 at 150 μm.

As is clear from the above dimensional relationship, the Z-directional displacement of the driven mass body 11 and the detection mass body 12 can be achieved as follows. When the thickness dimension of the support base plate 2 is set at a constant value, the thickness dimension of the primary base plate 1 may be set at two different values: one for one group of the frame 10, the fixing segment 17 and the stationary members 20, and the other for the remaining region. Further, when the thickness dimension of the detection mass body 12 is set at a value less than that of the driven mass body 11, the thickness dimension of the primary base plate 1 may be set at three different values: a first value for the frame 10, the fixing segment 17 and the stationary members 20, a second value for the detection mass body 12, and a third value for the remaining region. When the thickness dimension of the support base plate 2 is set at two different values: one for the junction between the fixing segment 17 and the stationary members 20, and the other for the remaining region, the thickness dimension of the primary base plate 1 may be set at two different values: one for the frame 10, the driven mass body 11, the coupling segment 16, the fixing segment 17 and the stationary members 20, and the other for remaining region. In this manner, each of the driven mass body 11 and the detection mass body 12 can have a different thickness dimension.

Figure 6:
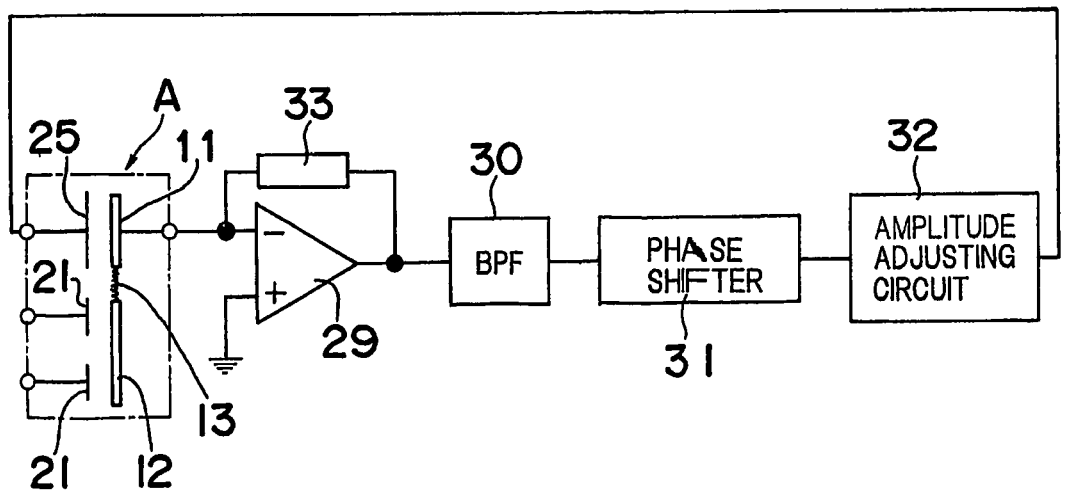
FIG. 6 is an explanatory diagram showing a driving circuit for use in the gyro sensor in FIG. 1.

A driving circuit for driving the gyro sensor will be described below with reference to FIG. 6 showing one example of the driving circuit, wherein some components of the gyro sensor A necessary for explaining the driving circuit are schematically shown in the region surrounded by one-dot chain line.

While the driven mass body 11 can be vibrated by applying a vibration voltage generated in a driving circuit, between the stationary driving electrode 25 and the driven mass body 11, a driving circuit illustrated in FIG. 6 is configured as a self-oscillation in combination with the gyro sensor A. The driving circuit in FIG. 6 forms a loop circuit in combination with the gyro sensor A and by use of an operational amplifier 29, wherein the driven mass body 11 is vibrated by positively feeding back a signal corresponding to vibration of the driven mass body 11 to the driven mass body 11. In this driving circuit, the driven mass body 11 is connected to an inverting input terminal of the operational amplifier 29, and an output of the operational amplifier 29 is fed back to the stationary driving electrode 25 through a band-pass filter (indicated by "BPF" in the figure) 30, a phase shifter 31 and an amplitude adjustment circuit 32.

A non-inverting input terminal of the operational amplifier 29 is grounded, and a feedback impedance 33 is inserted between the inverting input terminal and an output terminal of the operational amplifier 29. The output of the operational amplifier 29 is advanced by 90 degrees in phase through the phase shifter 31, and the vibrational amplitude of the phase-sifted signal is adjusted at a given value through the amplitude adjustment circuit 32. According to this driving circuit configured as above, when the driven mass body 11 is vibrated, a signal corresponding to the vibration of the driven mass body 11 is inverted and output from the output terminal of the operational amplifier 29. Then, the output signal is positively fed back to the driven mass body 11 by advancing the phase of the output signal by 90 degrees through the phase shifter 31 and further advancing it by 90 degrees between the stationary driving electrode 25 and the driven mass body 11. Thus, the vibration of the driven mass body 11 is maintained by the driving circuit.

The driven mass body 11 is connected to the detection mass body 12 through the torsionally deformable drive springs 13, and vibrated about a fulcrum located at one end, or first end, thereof on the side of the detection mass body 12 connected to the drive springs 13. That is, the other end, or second end, of driven mass body 11 on the opposite side of the drive springs 13 has the largest vibrational amplitude. For example, when the vibration voltage is increased, the second end of driven mass body 11 on the opposite side of the drive springs 13 is likely to be brought into contact with the support base plate 2. In the first embodiment, the stationary driving electrode 25 is formed on the support base plate 2 except for a region thereof opposed to a region of the driven mass body 11 where a vibrational amplitude is to be maximized (the second end on the opposite side of the drive springs 13). Thus, even if the second end of the driven mass body 11 is brought into contact with the support base plate 2, the second end will never be brought into contact with the, stationary driving electrode 25. This prevents the occurrence of short-circuiting between the driven mass body 11 and the stationary driving electrode 25 to eliminate the risk of a large current flowing into the driving circuit due to the short-circuiting. Therefore, even if the, driving circuit comprises a resistor-feedback amplifier using a resistor as the feedback impedance 33, the risk of interruption in operation due to output saturation can be avoided.

Figure 7:
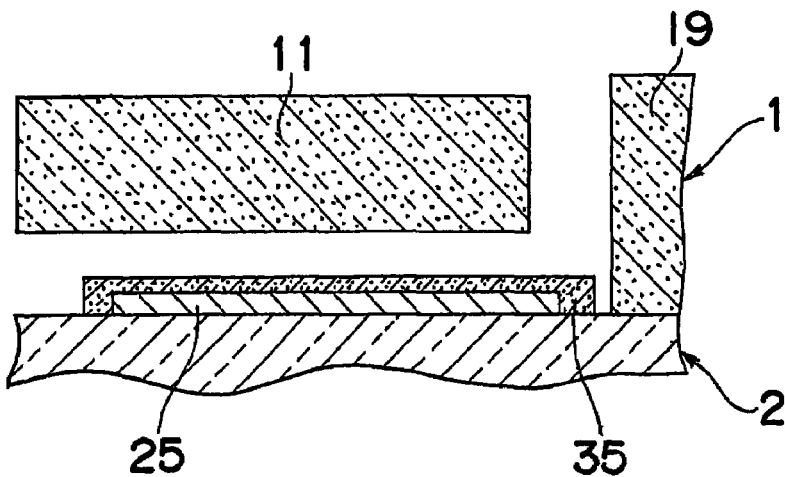
FIG. 7 is a fragmentary sectional view of the gyro sensor in FIG. 1.

Alternatively, the stationary driving electrode 25 is formed on the region of the support base plate 2 opposed to the region of the driven mass body 11 where a vibrational amplitude is to be maximized, and a surface of the stationary driving electrode 25 on the support base plate 2 may be covered by an insulating layer 34 having an electrically insulating performance, as shown in FIG. 7, to prevent the occurrence of short-circuiting due to the contact between the stationary driving electrode 25 and the second end of the driven mass body 11. The insulating layer 34 formed on the surface of the stationary driving electrode 25 provides a desirable effect of being able to prevent corrosion of the stationary driving electrode 25.

Further, the maximum vibrational amplitude of the driven mass body 11 is regulated by the distance between the driven mass body 11 and the stationary driving electrode 25. In the first embodiment, the distance between the driven mass body 11 and the stationary driving electrode 25 is set at a larger value at a region where the driven mass body 11 has a larger vibrational amplitude to allow the vibrational amplitude of the driven mass body 11 to be set as large as possible. The displacement amount of the detection mass body 12 in response to an angular velocity acting thereon is increased as the vibrational amplitude of the driven mass body 11 is increased. Thus, the detection sensitivity to angular velocity can be enhanced by setting the vibrational amplitude of the driven mass body 11 at a lager value. In the first embodiment, considering that the second end of the driven mass body 11 on the opposite side of the drive springs 13 has the largest vibrational amplitude, as described above, the driven mass body 11 is designed to have a smaller thickness at a position further away from the drive springs 13, so as to increase the distance between the driven mass body 11 and the stationary driving electrode 25. Alternatively, the stationary driving electrode 25 may be designed to have a smaller thickness in a region where the driven mass body 11 has a larger vibrational amplitude, or both the driven mass body 11 and the stationary driving electrode 25 may be designed to have a smaller thickness in a region where the driven mass body 11 has a larger vibrational amplitude.

Figure 8:
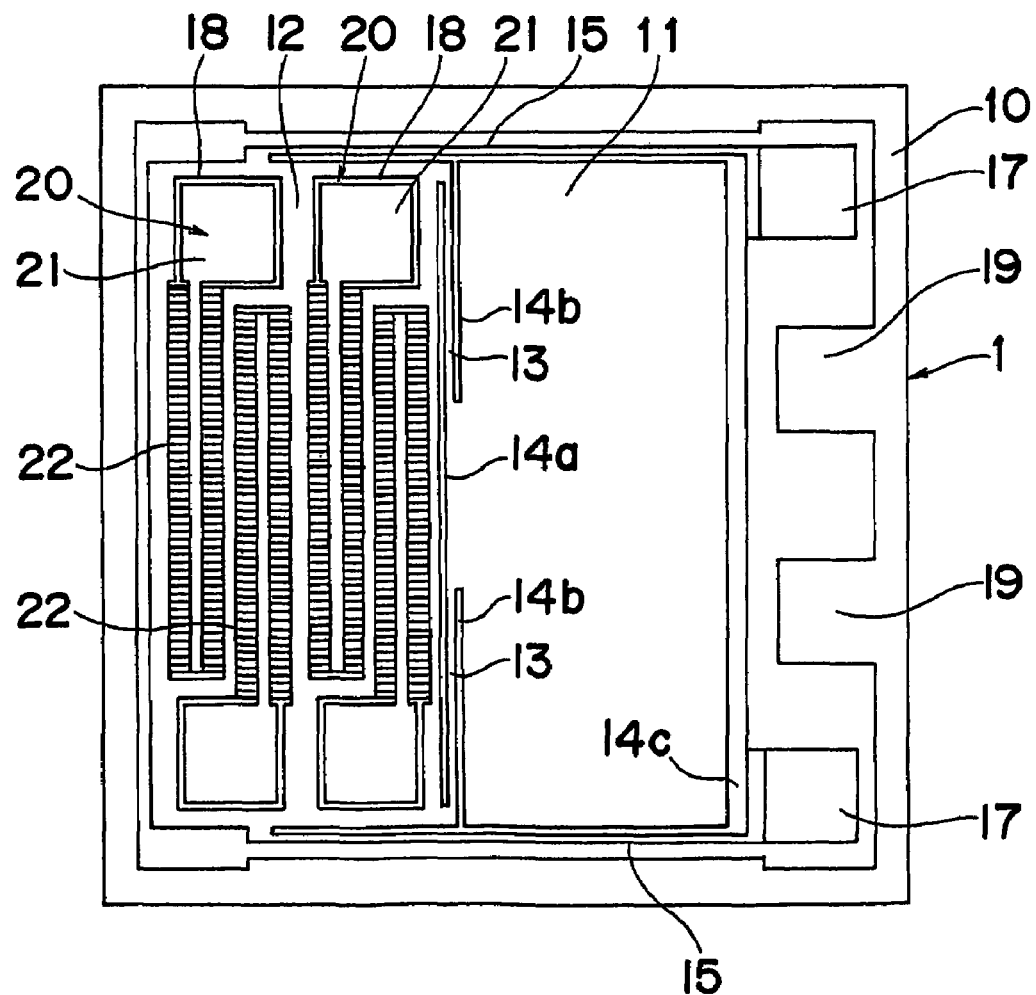
FIG. 8 is a top plan view showing a primary base plate for use in a gyro sensor according to another embodiment of the present invention.

While the gyro sensor according to the first embodiment has the single fixing segment 17 disposed in the longitudinally intermediate portion of the coupling segment 16, the intended purpose of the present invention can be achieved by connecting the driven mass body 11 and the detection mass body 12 through the drive springs 13 formed of a torsion spring to allow the detection mass body 12 to be displaceable relative to the drive springs 13, and providing the detection spring 17 displaceably supporting the detection mass body 12 relative to the support base plate 2 in a cantilever manner. Thus, as shown in FIG. 8, the fixing segment 17 may be provided continuously and integrally at each of the distal ends of the detection springs 15 without the coupling segment 16. In this structure, even if a thermal stress is generated due to the difference between respective thermal expansion coefficients of the primary base plate 1 and the support base plate 2, no thermal stress will be generated in the Y-direction, and thereby the gyro sensor will have almost no change in resonance frequency. This makes it possible to reduce the change in detection accuracy to be caused by temperature variations. Preferably, the detection spring 15 is designed to have a reduced spring constant in the X-direction in order to suppress adverse affects of a thermal stress in the X-direction. The gyro sensor according to the first embodiment is intended to measure an X-directional Coriolis force generated by an angular velocity acting around the Y-directional axis under the condition that the driven mass body 11 is being vibrated in the Z-direction, and designed such that the driven mass body 11 is translationally movable in the Z-direction, and the detection mass body 12 is rotatable around the X-directional axis and translationally movable in the X-direction. Alternatively, the gyro sensor may be designed such that the driven mass body 11 performs a rotational movement, or rotational and translational movements, or may be designed such that the detection mass body 12 performs only either one of rotational and translational movements. Further, the movement direction of each of the driven mass body 11 and the detection mass body 12 is not limited to a specific direction.

In the first embodiment, the change in electrical capacitance between the pair of electrode segments 21 aligned in the X-direction is detected to determine the displacement of the detection mass body 12. In the following embodiments, the change in electrical capacitance between a detection mass body 12 and each of a pair of electrode segments 21 aligned in the Y-direction is detected to determine the displacement of the detection mass body 12 In these embodiment, the detection mass body 12 is electrically connected a fixing segment 17 through detection springs 15 and a coupling segment 16, and a through-hole 26 is formed in a support base plate 2 in each of regions thereof corresponding to the fixing segment 17 and electrode segments 26. Thus, the electrical capacitance between the detection mass body 12 and each of the electrode segments 21 can be picked up from an electrode wiring 27 corresponding to each of the through-holes 26.

Second Embodiment

Figure 9:
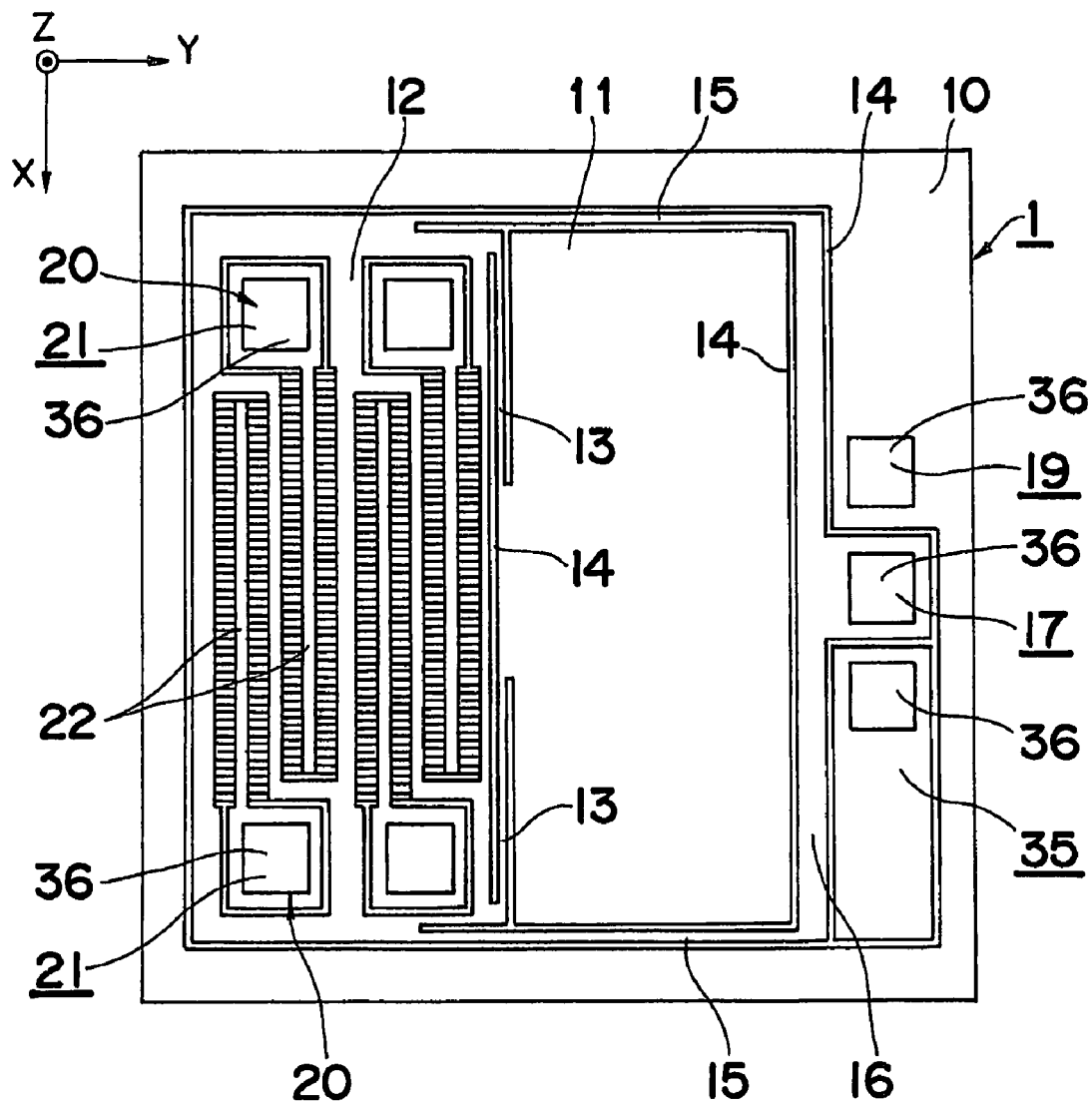
FIG. 9 is a top plan view showing a primary base plate for use in a gyro sensor according to a second embodiment of the present invention.

As shown in FIG. 9, a gyro sensor A according to the second embodiment comprises a connection segment 35 separated from a frame 10, in place of the lower ground segment 19 illustrated in FIG. 3 in the gyro sensor A according to the first embodiment. A connection pad 36 is formed on a surface region of the connection segment 35 opposed to the corresponding through-hole 26. While omitted in the figures for the first embodiment, the connection pad 36 is also formed on each of the fixing segment 17, the ground segment 19 and the electrode segments 21. The through-hole 26 is formed in the support base plate 2 in each of regions thereof corresponding to the connection pads 36.

Figure 10:
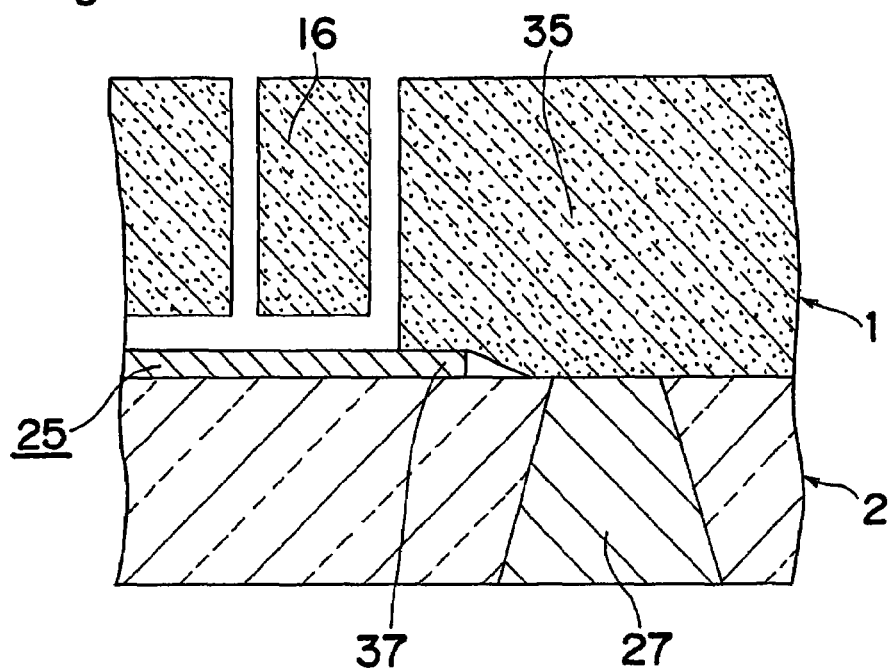
FIG. 10 is a fragmentary sectional view of the gyro sensor in FIG. 9.
Figure 11A:
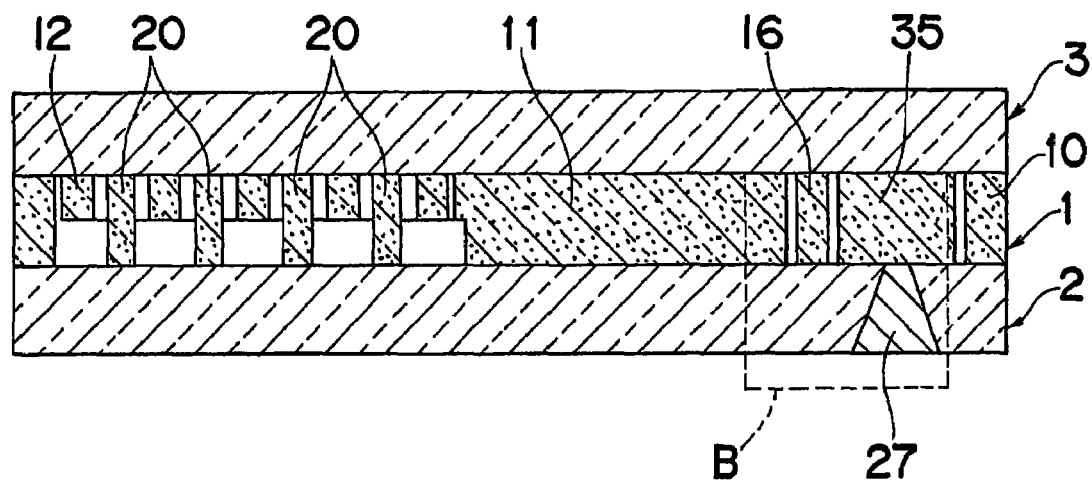
FIG. 11A is a sectional view of the gyro sensor in FIG. 9.
Figure 12A:
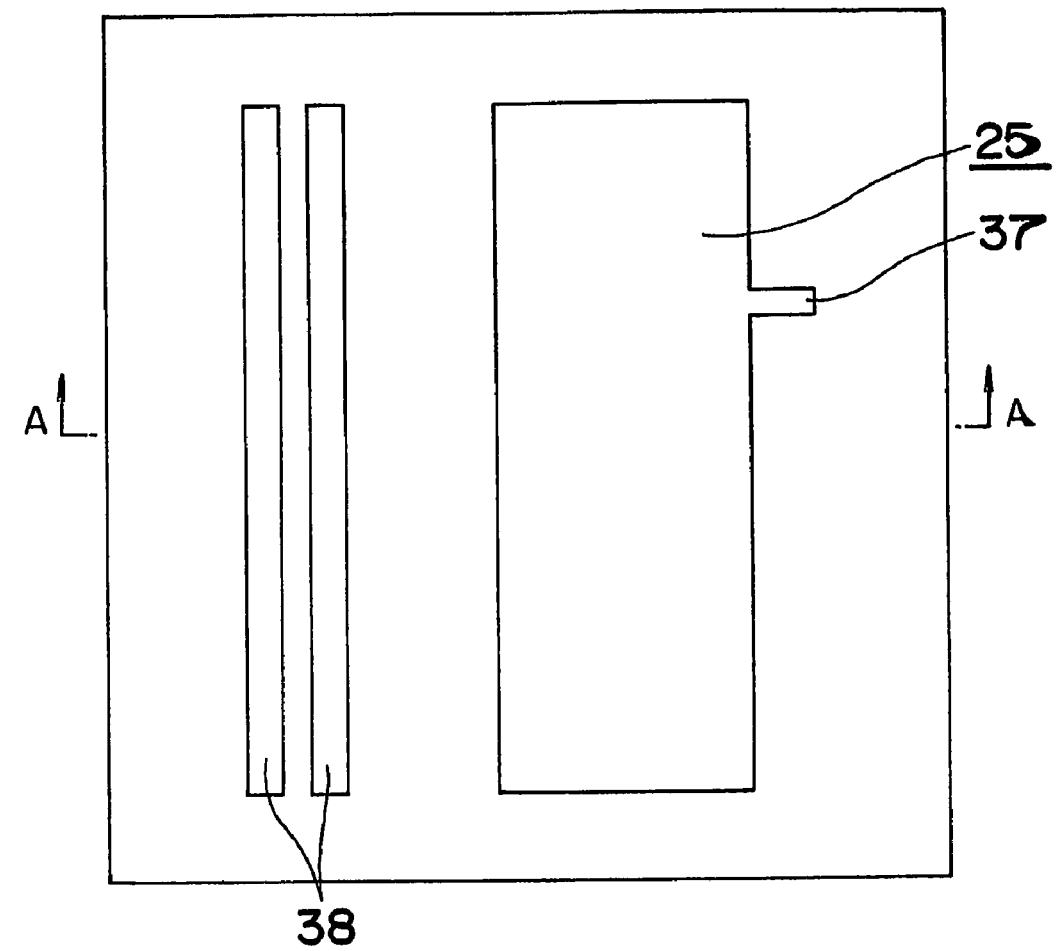
FIG. 12A is a top plan view showing a support base plate for use in a gyro sensor according to a third embodiment of the present invention, and each of FIGS. 12B and 12C is a sectional view taken along the line A-A in FIG. 12A.

The shape of a stationary driving electrode 25 in the second embodiment will be described with reference to FIG. 12A showing a support base plate 2 in a third embodiment. The stationary driving electrode 25 in the second embodiment includes a stationary-driving-electrode pad 37 extending rightwardly (in FIG. 12A) from a part of a right (in FIG. 12A) edge of the stationary driving electrode 25. In the state after the primary base plate 1 and the support base plate 2 are joined together, the distal end of the stationary-driving-electrode pad 37 extends up to a position opposed to the connection segment 35. Thus, as seen in FIG. 10 showing the region B in FIG. 11A, in the state after the connection segment 35 and the support base segment 2 is joined together, for example, by an anodic bonding process, each of the stationary-driving-electrode pad 37 and the electrode wiring 27 is in contact with the connection segment 35, and the stationary driving electrode 25 and the electrode wiring 27 are electrically connected to one another through the connection segment 35. This allows a vibration voltage from an external circuit to be applied between the stationary driving electrode 25 and the driven mass body 11 through the electrode wiring 27 and the connection segment 35. The above technique for connecting the stationary driving electrode 25 and the electrode wiring 27 makes it possible to connect the stationary driving electrode 25 to the external circuit without laying out wiring on the support base plate 2, such as a wire bonding process, which leads to downsizing of the base plate.

Figure 11B:
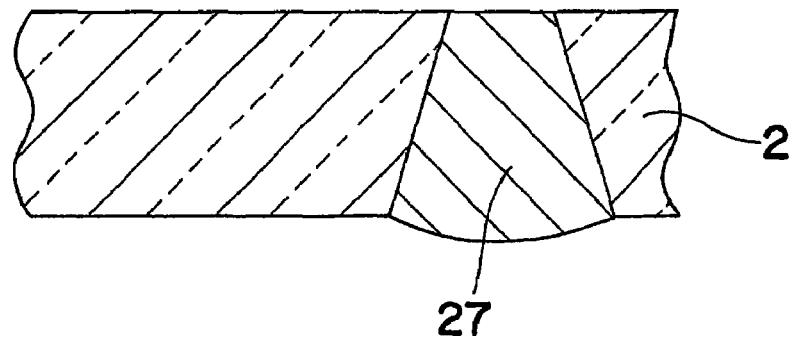
FIG. 11B is a fragmentary sectional view of the gyro sensor in FIG. 9.

Further, in the second embodiment, as shown in FIGS. 11A and 11B, the electrode wiring 27 is formed of a conductive material filled in each of the through-hole 26 in such a manner as to plug up the through-hole 26, in place of the metal thin film formed on each inner peripheral surface of the through-holes 26 of the support base plate 2 in the gyro sensor A according to the first embodiment. In FIGS. 11A and 11B, a conductive paste is used as the conductive material. The conductive material filled in the through-hole 26 to serve as the electrode wiring 27 can provide enhanced reliability in the electrical connection between the external circuit and each component of the primary base plate 1 as compared to the conductive metal thin film serving as the electrode wiring 27.

In the second embodiment, all grooves (a groove separating the frame, slit grooves 14a to 14c, grooves separating the stationary members 20) separating the components (the frame 10, the driven mass body 11, the detection mass body 12, the stationary members 20) of the primary base plate 1 are formed as a slit groove 14 penetrating through the primary base plate 1 in its thickness direction. The slit groove 14 is formed by an etching process. The slit groove 14 is formed to have the same width dimension in all regions, such as a region between movable comb-tooth segments 24 and stationary comb-tooth segments 23. This makes it possible to minimize the difference in etching rate, and facilitate the adjustment of a penetration time of the slit groove, so as to suppress undesirable etching to the support base plate 2 after the penetration, and prevent the occurrence of side etching due to a locally increased thermal resistance caused by etching. Thus, the primary base plate 1 can be formed with relatively high accuracy to provide enhanced accuracy in detecting the angular velocity.

Instead of the conductive paste, a metal piece may be embedded in each of the through-holes 26 to form the electrode wiring 27. The metal piece may be embedded in the through-hole 26 by a plating process. Thus, the technique for embedding the metal piece can be employed to allow a process for forming the electrode wiring 27b to be introduced in an established automated production line for semiconductors so as to facilitate reduction in production cost. In the process for embedding a metal piece in the through-hole, a portion of the metal piece protruding from a plate surface of the support base plate 2 may be removed by a grinding or polishing process to smooth or flatten the plate surface of the support base plate 2 including the electrode wiring 27. The remaining structures and functions are the same as those in the first embodiment.

Third Embodiment

As shown in FIG. 12A, a gyro sensor A according to a third embodiment of the present invention comprises a support base plate 2 formed with a stress relaxation groove 38 having a strip-shaped opening elongated in the X-direction. The stress relaxation groove 38 is formed in a region of the support base plate 2 opposed to a detection mass body 12.

Figure 12B:
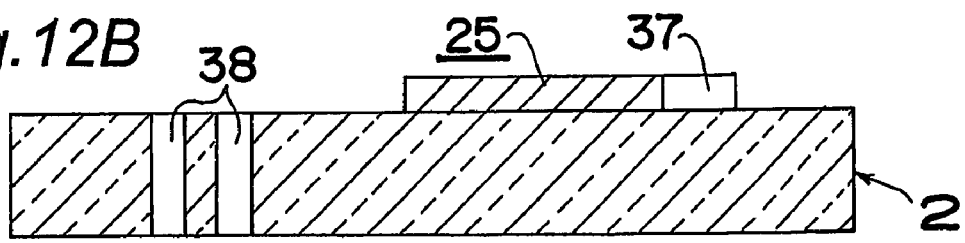
Figure 12C:
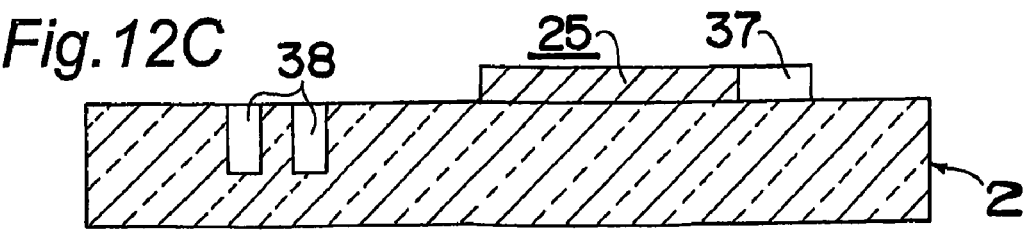

The stress relaxation groove 38 may penetrate through the support base plate 2 in its thickness direction as shown in FIG. 12B, or may not penetrate therethrough as shown in FIG. 12C. A technique for forming the stress relaxation groove 38 may include a reactive ion etching process, and a wet etching using hydrofluoric acid. According to the gyro sensor according to the third embodiment, even if the support base plate 2 and a primary base plate are different in thermal expansion coefficient, a thermal stress generated in the width direction of the stress relaxation groove 38 (Y-direction) is relaxed by the change in width dimension of the stress relaxation groove 38, so that a Y-directional internal stress in the support base plate 2 can be reduced by the stress relaxation groove 38. This makes it possible to almost eliminate the change in resonance frequency due to a Y-directional thermal stress generated in drive springs 13 so as to prevent the accuracy in detecting the angular velocity from being changed by temperature variations. The remaining structures and functions are the same as those in the second embodiment.

Fourth Embodiment

Figure 13:
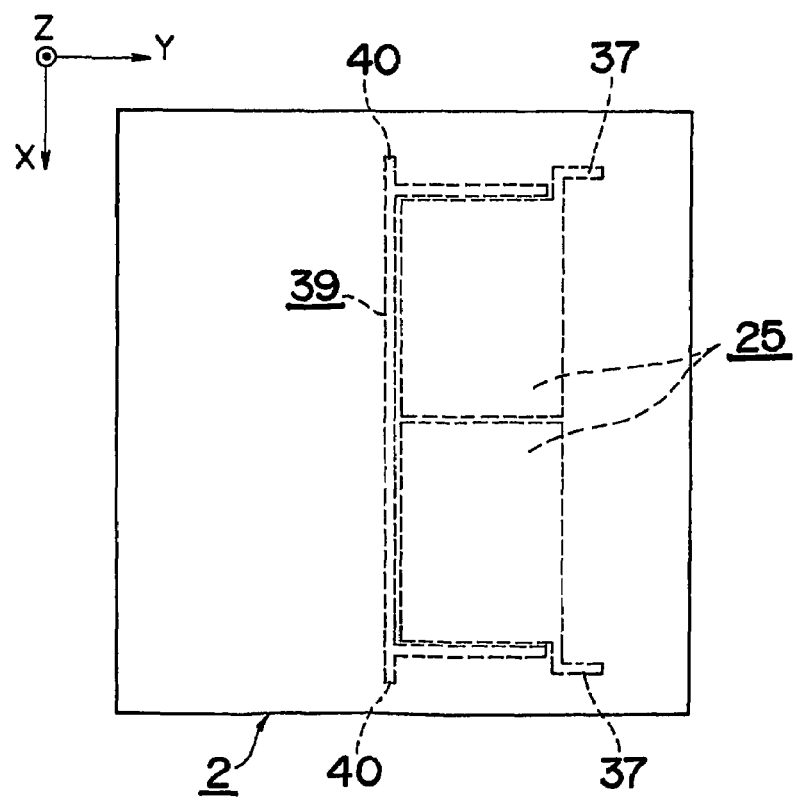
FIG. 13 is a top plan view showing a support base plate for use in a gyro sensor according to a fourth embodiment of the present invention.
Figure 14A:
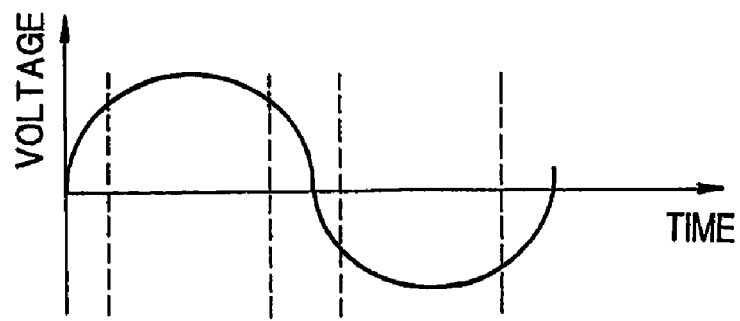
FIGS. 14A to 14D are explanatory operational diagrams of the gyro sensor according to the fourth embodiment.
Figure 14B:
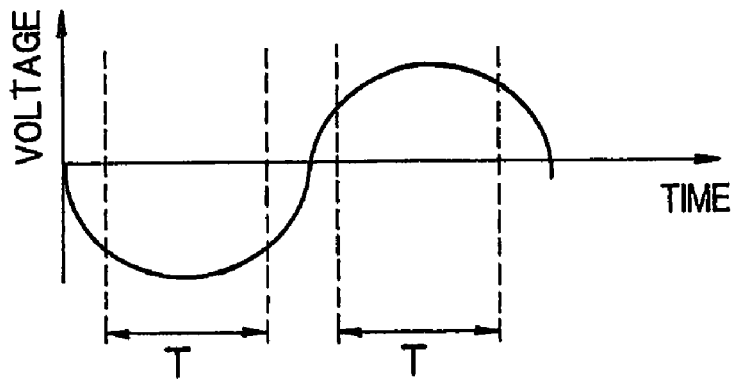
Figure 14C:
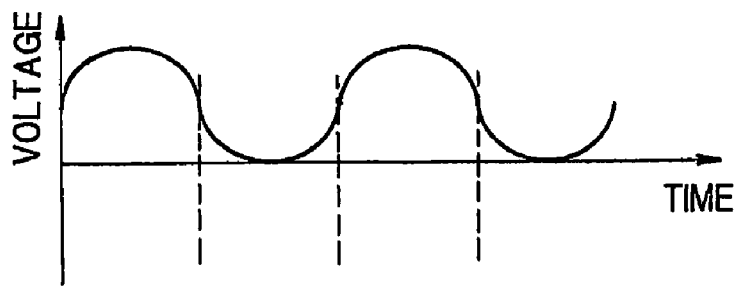
Figure 14D:
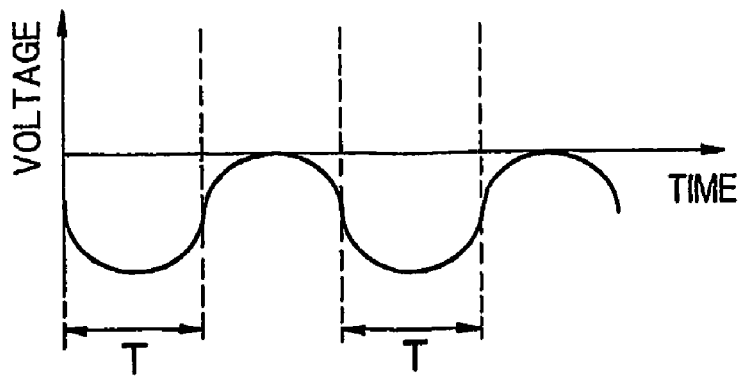

As shown in FIG. 13, a gyro sensor A according to a fourth embodiment of the present invention comprises a stationary driving electrode 25 disposed on a support base plate 2 and divided into two pieces in the X-direction. This gyro sensor is designed to apply two types of AC voltages as a vibration voltage between a driven mass body 11 and each of the stationary driving electrode pieces 25 so as to vibrate the driven mass body 11. As shown in FIGS. 14A and 14B, the AC voltages are adjusted to have reverse phases. In the fourth embodiment, the vibration voltages to be applied to the respective stationary driving electrode pieces 25 constantly have opposite polarities and the same absolute value during the period where the driven mass body 11 is driven. For example, as shown FIGS. 14C and 14D, the vibration voltages may be pulsating voltages having opposite polarities. According to the gyro sensor according to the fourth embodiment, two types of charges having opposite polarities and the same number are constantly generated in the driven mass body 11 during the period where the driven mass body is vibrated so that the potential of the drive driven mass body 11 is kept at a constant value. This makes it possible to almost eliminate the change in resonance frequency of the gyro sensor due to potential change in the driven mass body 11 so as to suppress the change in detection accuracy. In FIGS. 14C and 14D, the period where the driven mass body 11 and the stationary driving electrode pieces 25 are pulled mutually by an electrostatic force is indicated by T.

Further, a ground wiring 39 is formed on the support base plate 2 to surround the pair of stationary driving electrode pieces 25 except for one edge of the support base plate 2 on the right side in FIG. 13. The ground wiring 39 has the same potential as a ground potential serving as a reference potential of the gyro sensor A. For example, when the driving circuit as described in the first embodiment is connected to the gyro sensor A, respective potentials of a signal ground of the driving circuit and the ground wiring 39 become equal. The low-impedance ground wiring 39 formed around the stationary driving electrode pieces 25 makes it possible to reduce noises to be radiated, particularly, to the detection mass body 12 so as to provide enhanced accuracy in detecting the angular velocity.

As shown in FIG. 13, each of the stationary driving electrode pieces 25 has a stationary-driving-electrode pad 37 extending in the X-direction (rightward in FIG. 13) from a corresponding one of X-directional ends of the right (in FIG. 13) edge of the stationary driving electrode pieces 25. A connecting segment 35 separated from a frame 10 is provided in a region of a primary base plate 1 opposed to the distal end of each of the stationary-driving-electrode pads 37, in the state after the primary base plate 1 and the support base plate 2 are joined together (see FIG. 17). Thus, in the state after the connection segment 35 and the support base plate 2 are joined together, the stationary driving electrode pieces 25 and an electrode wiring 27 corresponding to the connection segment 35 are electrically connected to one another through the connection segment 35. Further, the ground wiring 39 has a ground-wiring pad 40 extending in the X-direction from each of X-directional ends of the left (in FIG. 13) edges of the stationary driving electrode pieces 25. When the ground-wiring pad 40 is brought into contact with the frame 10, it is electrically connected to a ground segment 19 continuous with the frame 10, and then to an electrode wiring 27 corresponding to the ground segment 19. The remaining structures and functions are the same as those in the second embodiment.

Fifth Embodiment

A gyro sensor A according to a fifth embodiment of the present invention is designed such that the distance between the driven mass body 11 and the stationary driving electrode 25, and the electrostatic capacitance (hereinafter referred to as "detection capacitance") between the stationary comb-tooth segments 23 and the movable comb-tooth segments 24, can be adjusted under the condition that no vibration voltage is applied, and neither angular velocity nor acceleration acts, in the gyro sensor A according to the fourth embodiment.

Figure 15:
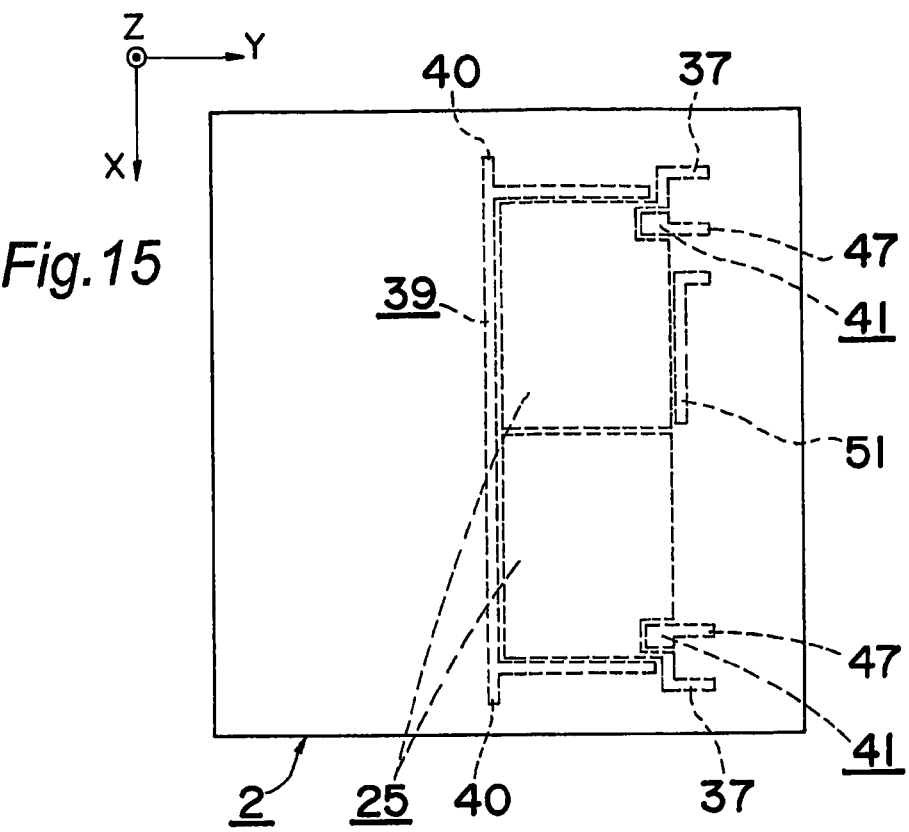
FIG. 15 is a top plan view showing a support base plate for use in the gyro sensor according to a fifth embodiment of the present invention.
Figure 16:
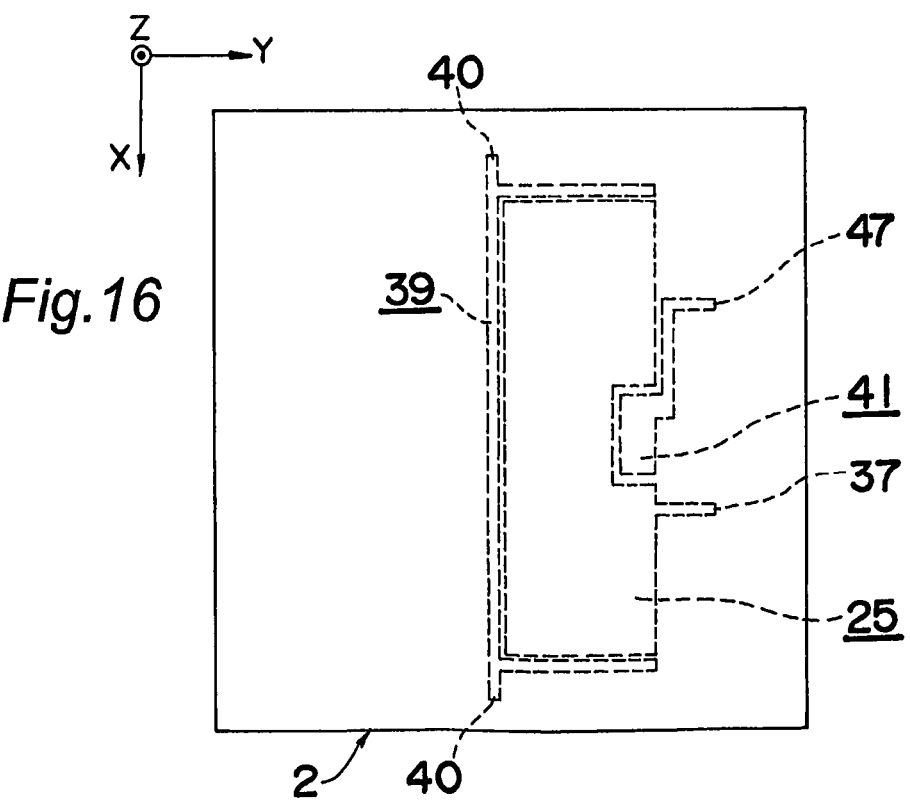
FIG. 16 is a top plan view showing a support base plate for use in a gyro sensor according to another embodiment of the present invention.

Specifically, as shown in FIG. 15, the stationary driving electrode pieces 25 are partly separated to form a pair of distance-adjusting electrodes 41 serving as a means for adjusting the distance between the driven mass body 11 and the stationary driving electrode 25. An L-shaped acceleration-detecting electrode pad 51 will be described in connection with an after-mentioned sixth embodiment.

According to the gyro sensor according to the fifth embodiment, the distance between the driven mass body 11 and one of the stationary driving electrode pieces 25 can be adjusted by applying a DC voltage between the driven mass body 11 and one of the distance-adjusting electrodes 41 to generate an electrostatic force therebetween. Thus, even if each of the pair of stationary driving electrode pieces 25 has a different distance relative to the driven mass body 11, such different distances can be uniformed. Further, even if the distance between the driven mass body 11 and each of the stationary driving electrode pieces 25 has variations in each gyro sensor A, the distance between the driven mass body 11 and each of the stationary driving electrode pieces 25 can be adjusted by applying a DC voltage between the pair of distance-adjusting electrodes 41. This makes it possible to prevent variation in vibrational amplitude of the driven mass body 11 in each gyro sensor A to provide enhanced accuracy of the gyro sensor A.

In cases where the stationary driving electrode 25 is a single piece as the gyro sensor according to the first embodiment without dividing it into two pieces, it is preferable that a part of the stationary driving electrode 25 is separated to form a distance-adjusting electrode 41, and an electrostatic force is generated between distance-adjusting electrode 41 and the driven mass body 11 to adjust the distance between the driven mass body 11 and he stationary driving electrode 25. Thus, even if the distance between the driven mass body 11 and the stationary driving electrode 25 has variations in each gyro sensor A, such different distances can be uniformed to prevent variation in vibrational amplitude of the driven mass body 11 in each gyro sensor A to provide enhanced accuracy of the gyro sensor A.

Figure 17:
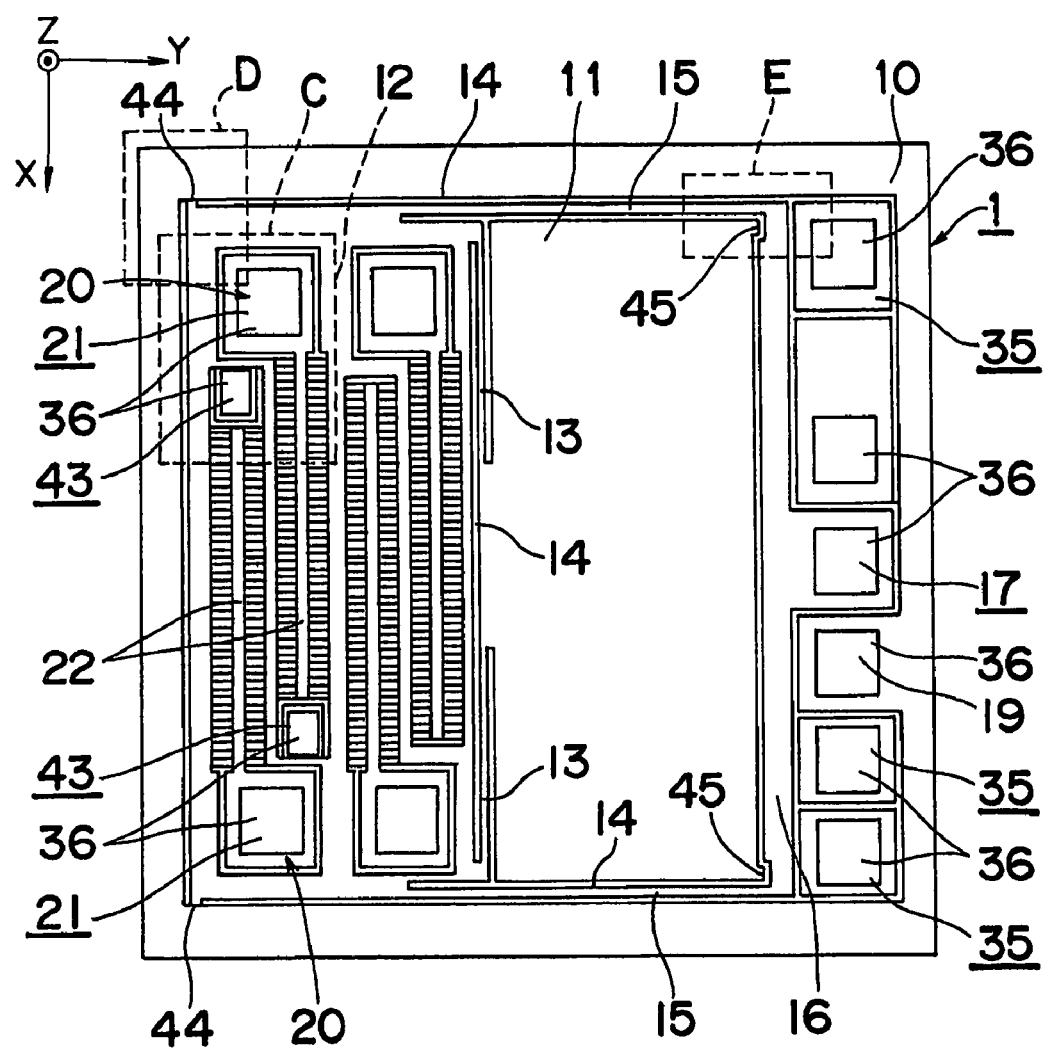
FIG. 17 is a top plan view showing a primary base plate for use in the gyro sensor according to the fifth embodiment of the present invention.
Figure 18:
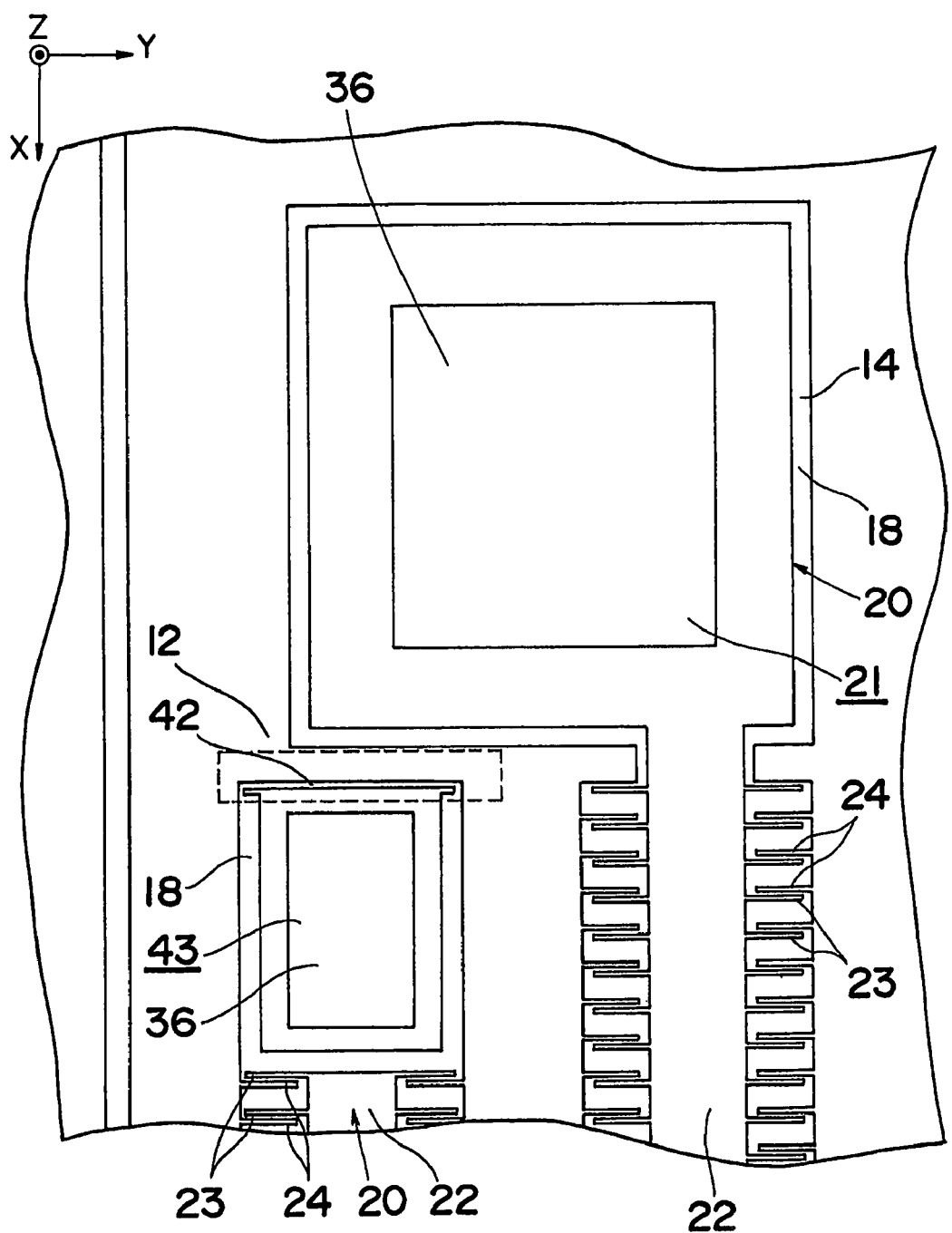
FIG. 18 is a fragmentary top plan view showing the portion C in FIG. 17.

The capacitance-adjusting electrode 42 (see FIG. 18) fixed to the support base plate 2 is formed on the primary base plate 1 to serve as a means for adjusting a detection capacitance. As shown in FIG. 17, the capacitance-adjusting electrode 42 is formed as a part of a capacitance-adjusting segment 43 disposed between the detection mass body 12 and the distal end of a comb-skeleton 22 on the opposite side of an electrode segment 21 in a cutoff hole 18. As seen in FIG. 18 showing the region C in FIG. 17, the capacitance-adjusting segment 43 has rectangular shape elongated in the X-direction, and an edge of the capacitance-adjusting segment 43 on the side of the detection mass body 12 in the X-direction extends in the Y-direction to have an increased facing area relative to the detection mass body 12. The capacitance-adjusting electrode 42 is formed on a surface of the capacitance-adjusting segment 43 opposed to the detection mass body 12 in the X-direction. According to this structure, the distance between the stationary comb-tooth segments 23 and the movable comb-tooth segments 24 can be adjusted by applying a DC current between the capacitance-adjusting electrode 42 and the detection mass body 12 to generate an electrostatic force therebetween. Thus, even if the distance and/or the facing area between the stationary comb-tooth segments 23 and the movable comb-tooth segments 24 have variations in each cutoff hole in one gyro sensor A (or each gyro sensor A), the detection capacitance can be uniformed to provide enhanced accuracy of the gyro sensor.

Further, a connection pad 36 is provided on a surface of the capacitance-adjusting segment 43 opposed to the support base plate 2, and an electrode wiring 27 is formed in a region of the support base plate 2 opposed to the connection pad 36. Thus, when the electrode wiring 27 corresponding to the capacitance-adjusting segment 43 is brought into contact with the connection pad 36, it is electrically connected to the capacitance-adjusting electrode 42, and thereby the capacitance-adjusting electrode 42 and an external circuit can be connected to one another through the electrode wiring 27.

The gyro sensor according to the fifth embodiment includes a stopper for regulating a maximum displacement position of the detection mass body 12 and the driven mass body 11. A stopper (detection-mass-body-protecting protrusion) for regulating a maximum displacement position of the detection mass body 12 will be firstly described below.

Figure 19A:
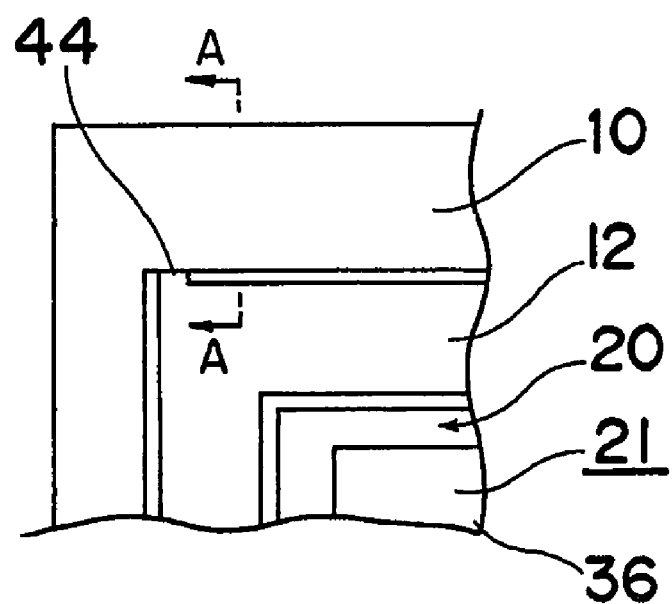
FIGS. 19A and 19B are, respectively, a fragmentary top plan view and a fragmentary sectional view showing the portion D in FIG. 17.
Figure 19B:
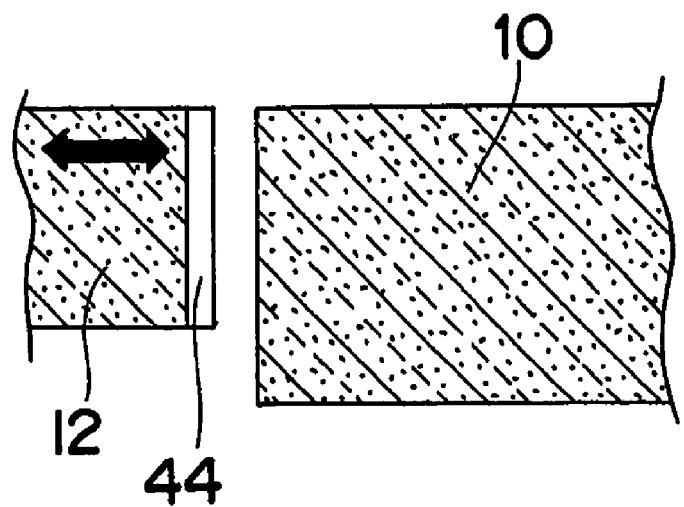

The detection mass body 12 is designed to have a relatively low rigidity in a direction (X-direction) of displacement caused by a Coriolis force so as to be displaced by the Coriolis force in response to an angular velocity acting on the primary base plate 1, and a structure readily displaceable in response to an acceleration acting in the X-direction. As shown in FIG. 17, the stopper 44 is formed to protrude from a pair of corners (upper left and lower left in FIG. 17) of the detection mass body 12 in the displacement direction (X-direction) of the detection mass body 12 (see FIG. 19A showing the region D in FIG. 17). In a normal condition, the distal end of the stopper 44 and the frame 10 is spaced apart from one another, as shown in FIG. 19B. When the detection mass body 12 is excessively displaced, for example, due to impact caused by dropping or the like, the stopper 44 is brought into contact with the frame 10 to prevent damages of the detection springs 15. The stopper 44 may be provided in the frame 10.

Figure 20A:
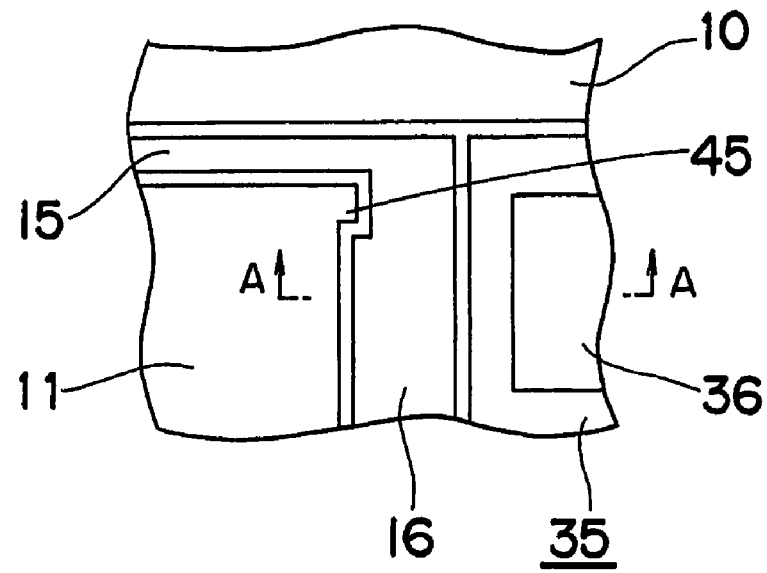
FIGS. 20A and 20B are, respectively, a fragmentary top plan view and a fragmentary sectional view showing the portion E in FIG. 17.
Figure 20B:
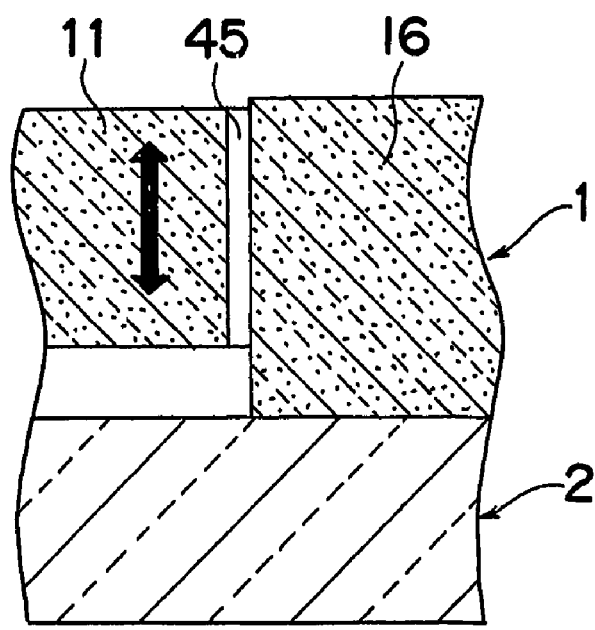

As shown in FIG. 17, a stopper (driven-mass-body-protecting protrusion) for regulating a maximum displacement position of the driven mass body 11 is formed to protrude from a pair of corners (upper right and lower right in FIG. 17) of the driven mass body 11 in the Y-direction orthogonal to the displacement direction of the detection mass body 12 in a plane along the plate surface of the primary base plate 1 (see FIG. 20A showing the region E in FIG. 17). The driven mass body 11 is connected to the detection mass body 12 through torsionally deformable drive springs 13, and vibrated around a fulcrum located on the side of the detection mass body 12 connected to the drive springs 13. When the driven mass body 11 is excessively displaced in the Z-direction, for example, due to impact caused by dropping or the like, the stopper 45 disposed at one end on the opposite side of the fulcrum is brought into contact with the support base plate 2 or the cap 3 to prevent damages of the detection springs 15 and/or the drive springs 13 (see FIG. 20B). While the stopper 45 may be provided in the support base plate 2, the structure in the fifth embodiment makes it possible to readily add a function of the stopper 45 only by modifying the shape of the driven mass body 11.

In addition, when the detection mass body 12 or the driven mass body 11 is excessively displaced, each of the stoppers 44, 45 is brought into contact with the frame 10, the support base plate 2 or the cap 2, only by their distal end or a relatively small area. This can prevent the detection mass body 12 and the driven mass body 11 from being locked to the frame 10, the support base plate 2 or the cap 2.

Figure 21:
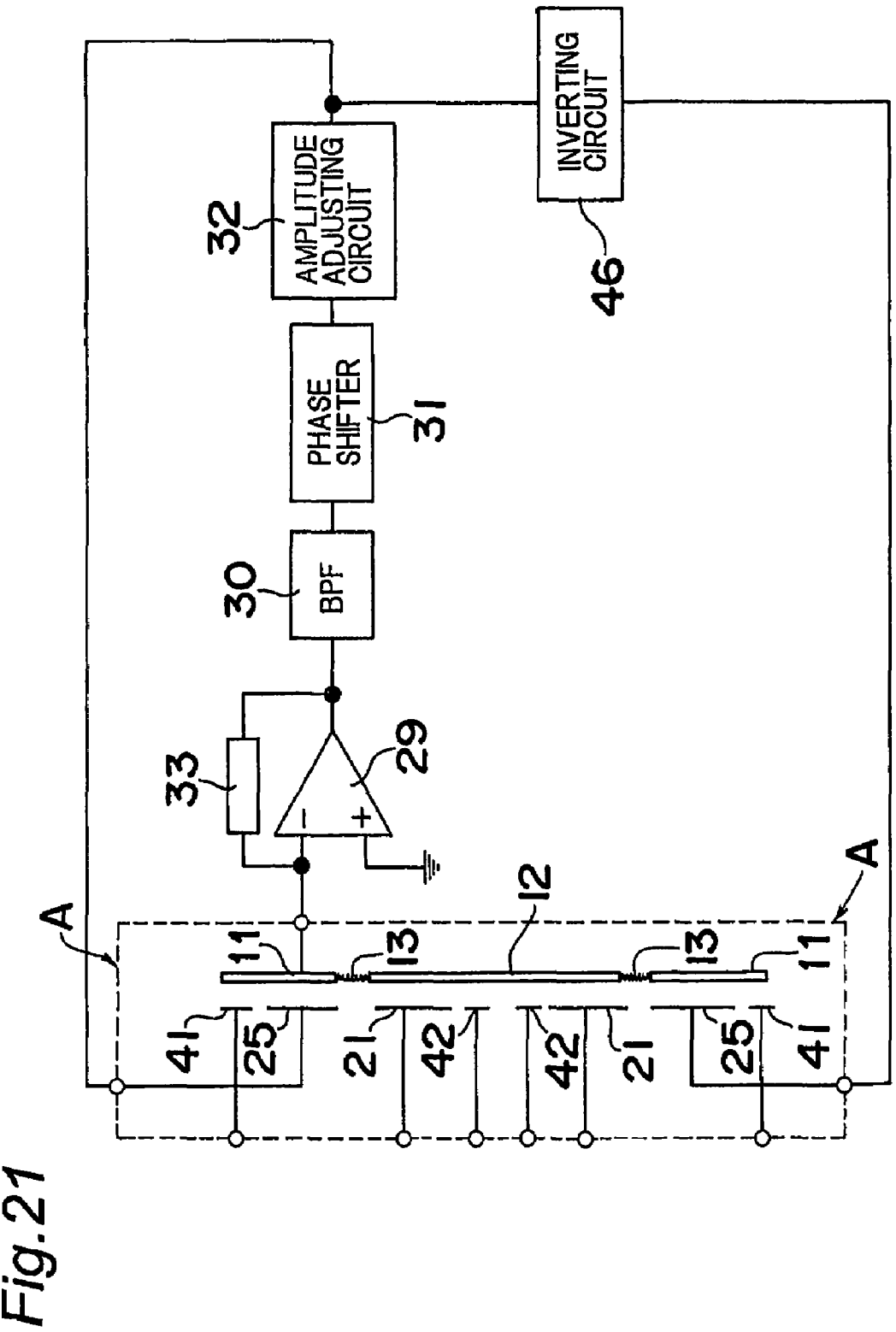
FIG. 21 is an explanatory diagram showing a driving circuit for use in the gyro sensor according to the fifth embodiment.

A driving circuit for driving the gyro sensor A will be described with reference to FIG. 21 showing one example of the driving circuit. In FIG. 21, some components of the gyro sensor A necessary for explaining the driving circuit are schematically shown in the region surrounded by one-dot chain line. The driving circuit illustrated in FIG. 21 has the same fundamental structure as that described in connection with the first embodiment, and the description about the same element or component as that in the first embodiment will be omitted.

In the fifth embodiment, a first stationary driving electrode piece 25 is connected to the driving circuit in the same manner as that in the second embodiment, and a second stationary driving electrode piece 25 is connected to the driving circuit through an inverting circuit 46 for inverting the polarity of a vibration voltage relative to the first stationary driving electrode piece 25. Thus, two types of voltages having opposite polarities and the same absolute value are applied to the pair of stationary driving electrode pieces 25, respectively.

As shown in FIG. 15, each of the distance-adjusting electrodes 41 has a distance-adjusting-electrode pad 47 having a portion extending rightward (in FIG. 15) from the right (in FIG. 15) edge thereof. As shown in FIG. 17, a connection segment 35 separated from the frame 10 is provided on a region of the primary base plate 1 opposed to the distal end of the distance-adjusting-electrode pad 47, in the state after the primary base plate 1 and the support base plate 2 joined together. Thus, in the state after the connection segment 35 and the support base plate 2 are joined together, the distance-adjusting electrode 41 and an electrode wiring 27 corresponding to the connection segment 35 are electrically connected to one another through the connection segment 35. The remaining structures and functions are the same as those in the fourth embodiment.

Sixth Embodiment

Figure 22A:
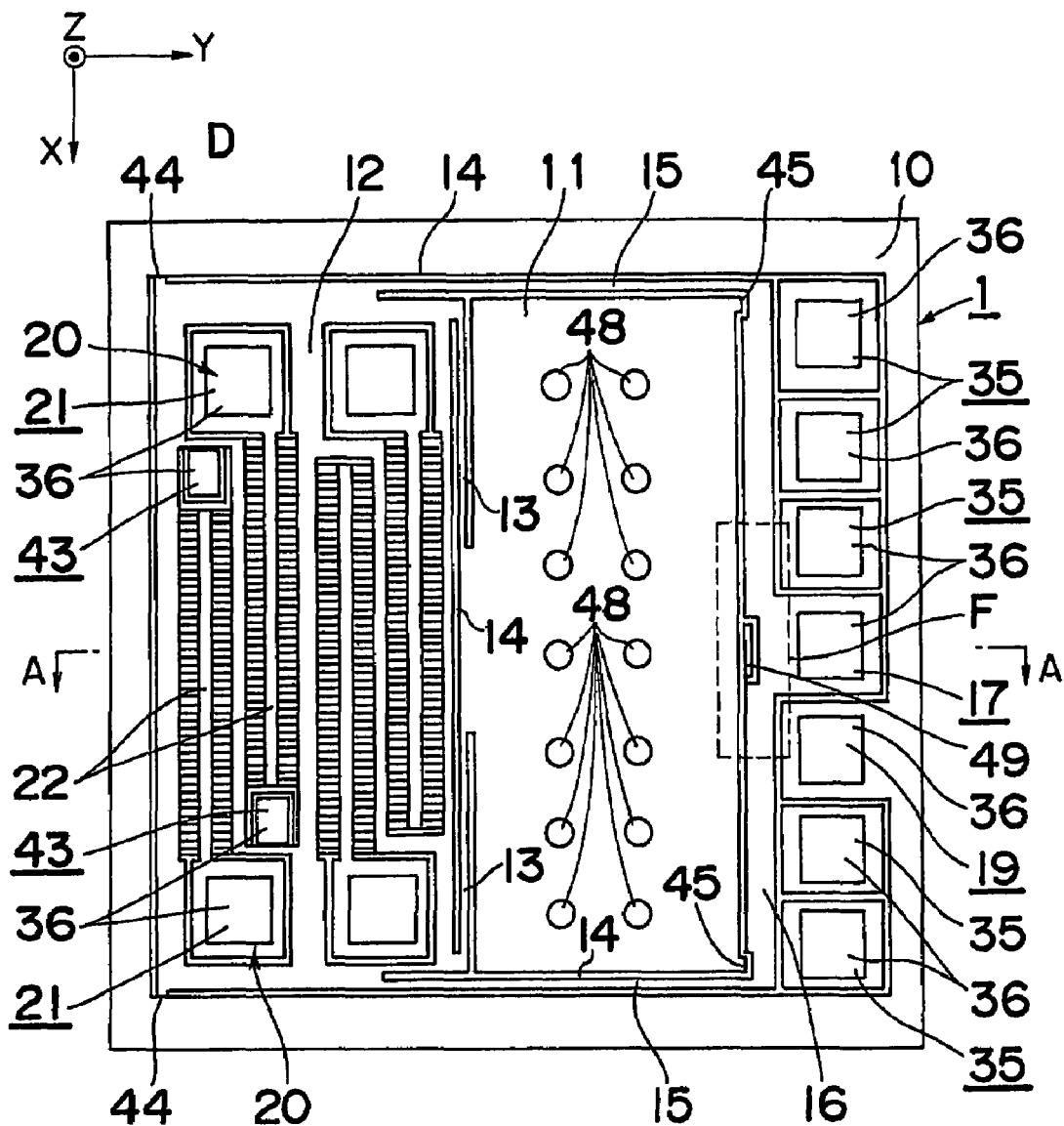
FIG. 22A is a top plan view of a gyro sensor according to a sixth embodiment of the present invention.
Figure 22B:
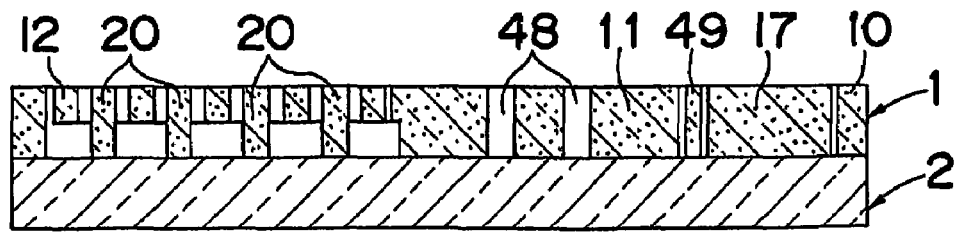
FIG. 22B is a sectional view taken along the line A-A in FIG. 22A.

As shown in FIGS. 22A and 22B, a gyro sensor A according to a sixth embodiment of the present invention is based on the gyro sensor A according to the fifth embodiment, and additionally formed with a through-hole 48 penetrating through the driven mass body 11 in its thickness direction (Z-direction). In FIG. 22A, fourteen of the through-holes 48 each having a circular opening are formed. These through-holes 48 are arranged in the Y-direction in two rows each including seven through-holes. The through-holes 48 may be formed by a reactive-ion etching process. When the driven mass body 11 is vibrated in the Z-direction, this structure can reduce damping due to air viscosity to provide enhanced mechanical Q value of the driven mass body 11 in the Z-direction. Thus, the vibrational amplitude in the driven mass body 11 is increased. This provides larger Coriolis force to be generated in the X-direction to obtain desirably enhanced sensitivity.

The shape of the through-hole 48 is not limited to the specific shape illustrated in FIG. 22A. For example, the through-holes 48 aliened in the X-direction may be entirely integrated in such a manner that two lines each having a strip-shaped opening elongated in the displacement direction of the detection mass body 12 (X-direction) are arranged in parallel in the Y-direction. This through-hole 48 elongated in the X-direction makes it possible to reduce damping due to air viscosity when the driven mass body 11 is vibrated in the X-direction so as to provide enhanced mechanical Q value of the driven mass body 11 in the X-direction, and thereby facilitate the X-directional displacement of the detection mass body 12 (and the driven mass body 11) when an angular velocity around the Y-directional axis acts on the primary base plate 1 to provide desirably enhanced sensitivity.

Figure 23A:
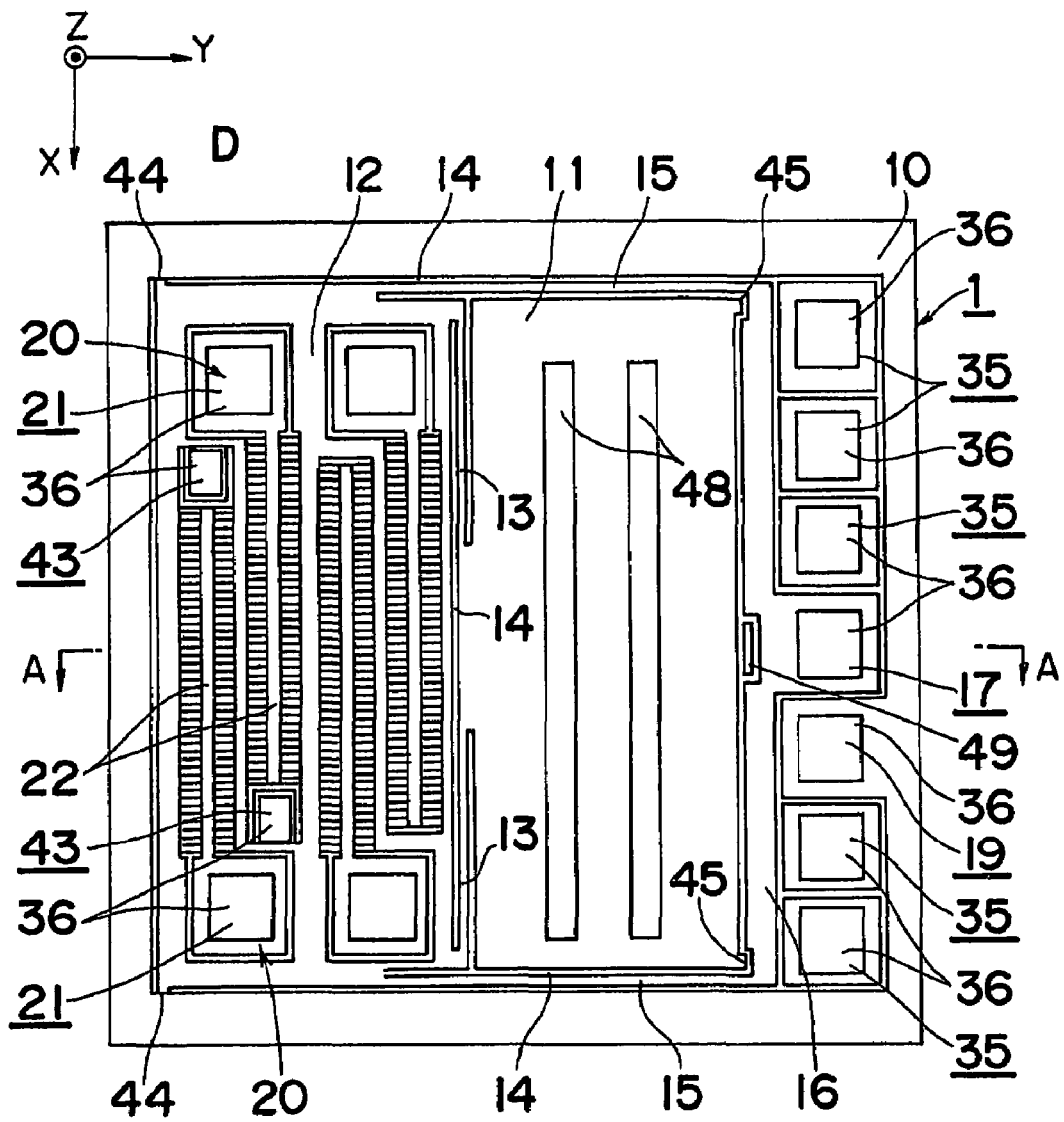
FIG. 23A is a top plan view of a gyro sensor according to another embodiment of the present invention.
Figure 23B:
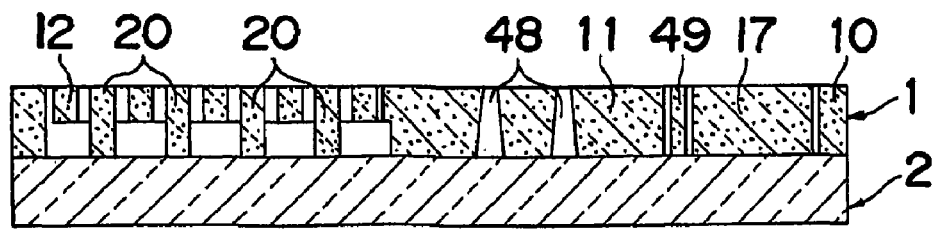
FIG. 23B is a sectional view taken along the line A-A in FIG. 23A.

The through-hole 48 may be formed in a tapered shape whose sectional area along a plate surface of the primary base plate 1 becomes smaller at a position further away from the support base plate 2, as shown in FIG. 23B. In this case, the through-holes 48 can provide a desirable effect of being able to reduce the mass of the driven base body 11 so as to minimize the deterioration in mechanical Q value of the driven base body 11. FIG. 23B is a sectional view taken along the line A-A in FIG. 23A. The through-hole 48 illustrated in FIG. 23B may also be formed in a tapered shape.

Figure 24:
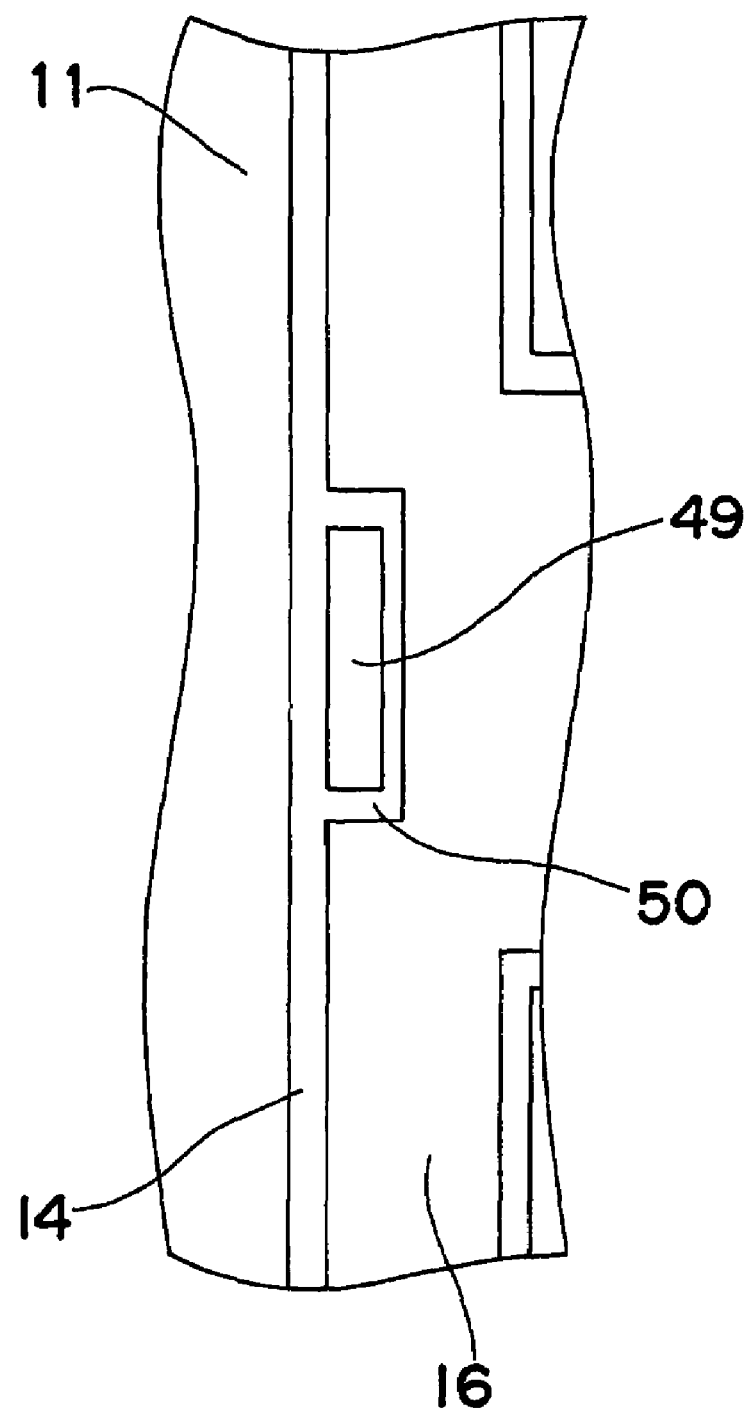
FIG. 24 is a fragmentary top plan view showing the portion F in FIG. 22A.

In the sixth embodiment, as shown in FIG. 22, an acceleration-detecting electrode 49 is formed on the primary base plate 1 at a position opposed to a part of one end of the driven base body 11 on the opposite side of the detection mass body 12. The acceleration-detecting electrode 49 is disposed in an electrode arrangement concave portion 50 which is formed in an X-directionally intermediate portion of a connection segment located away from the driven base body 11 to provide a larger distance relative to the driven base body 11. The accel-eration-detecting electrode 49 has a surface on the side of the driven base body 11, which is formed to be flush with a surface of the coupling segment 16 on both sides of, or around, the electrode arrangement concave portion 50 (see FIG. 24 showing the region F in FIG. 22A). In this groove, the driven base body 11 and the acceleration-detecting electrode 49 are opposed to one another in the Y-direction. Thus, the change in distance between the driven base body 11 and the acceleration-detecting electrode 49 caused by the Y-directional displacement of the driven base body 11 inn response to an acceleration acting thereon in the Y-direction can be detected in accordance with the change in electrostatic capacitance between the driven base body 11 and the acceleration-detecting electrode 49. That is, in addition to an angular velocity around the Y-directional axis, the gyro sensor according to the sixth embodiment can be used for detecting an acceleration acting in the Y-direction by use of the function of the driven base body 11 and the acceleration-detecting electrode 49 serving as acceleration detecting means.

As shown in FIG. 15, an L-shaped acceleration-detecting-electrode pad 51 is formed on the support base plate 2 to extend downwardly (in FIG. 15) from a region opposed to the acceleration-detecting electrode 49, and have a distal end extending rightwardly (in FIG. 15). Further, as shown in FIG. 22A, a connection segment 35 separated from the frame 10 is provided on a region of the primary base plate 1 opposed to one end of the acceleration-detecting-electrode pad 51 on the opposite side of the acceleration-detecting electrode 49, in the state after the primary base plate 1 and the support base plate 2 are joined together. Thus, in the state after the connection segment 35 and the support base plate 2 are joined together, the acceleration-detecting electrode 49 and an electrode wiring 27 corresponding to the connection segment 35 are electrically connected to one another through the connection segment 35. The remaining structures and functions are the same as those in the fifth embodiment.

Seventh Embodiment

Figure 26A:
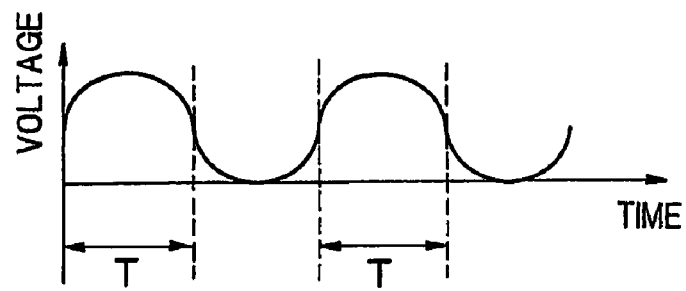
FIGS. 26A and 26B are explanatory operational diagrams of the sensor apparatus according to the seventh embodiment.
Figure 26B:
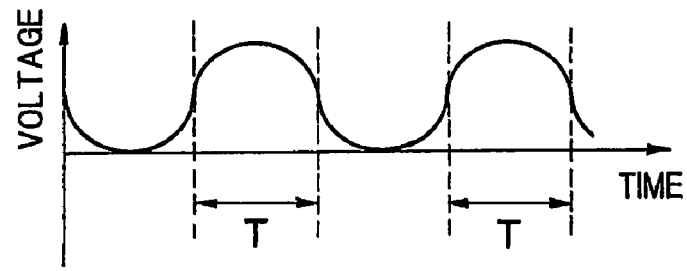

In a seventh embodiment of the present invention, a sensor apparatus comprising two of the gyro sensors A according to the second embodiment, as shown in FIG. 25, will be described below. The gyro sensors A are arranged to have the same X, Y and Z directions, and positioned such that one of the gyro sensors is rotated by 180 degree about the Z-direction. This sensor apparatus includes a differential interface circuit 52 (signal processing section) operable to output the difference between respective outputs of the gyro sensors A (the change in electrostatic capacitance between the stationary comb-tooth segments 23 and the movable comb-tooth segments 24. For example, the differential interface circuit 52 comprises an operational amplifier. Vibration voltages to be applied to the gyro sensor are pulsating voltages having reverse phases, as shown in FIGS. 26A and 26B, so as to allow the respective driven mass bodies 11 of the gyro sensors to be alternately displaced in the Z-direction. In FIGS. 26A and 26B, the period where the driven mass body 11 and the stationary driving electrode 25 are pulled mutually by an electrostatic force is indicated by T.

In the sensor apparatus according to the seventh embodiment, when an angular velocity around the Y-directional axis (the arrow G in FIG. 25), the respective driven mass bodies 11 of the gyro sensors A are vibrated in opposite directions, and thereby a Coriolis force acts on the respective detection mass body 12 the gyro sensors A in opposite directions to displace the respective detection mass body 12 the gyro sensors A in opposite directions (the arrow H in FIG. 25). Thus, the gyro sensors A generate outputs having reverse phases, and thereby the outputs of the gyro sensors A are amplified 2 times and output from the differential interface circuit 52. When an X-directional acceleration acts thereon (the arrow I in FIG. 25), the respective driven mass bodies 11 of the gyro sensors A are displaced in the same direction (the arrow J in FIG. 25). Thus, the outputs of the gyro sensors A having the same phase are canceled one another in the differential interface circuit 52, and thereby the output of the differential interface circuit 52 becomes zero. That is, the sensor apparatus comprising two of the gyro sensors A provides an advantage of being able to provide two times higher sensitivity to angular velocity acting around one-directional axis and being less susceptible to an acceleration acting in one direction.

The gyro sensor having the stationary driving electrode 25 divided into two pieces as in the second embodiment may also be used as the respective gyro sensor A in the sensor apparatus. In this case, for example, pulsating voltages having reverse phases are applied, respectively, to gyro sensors A to allow the respective driven mass bodies 11 of the gyro sensors A to be vibrated in opposite directions. The remaining structures and functions are the same as those in the second embodiment.

In the gyro sensor A according to the second embodiment, the stationary driving electrode 25 on the support base plate 2 protrudes by the thickness dimension thereof at a surface of the support base plate 2 opposed to the primary base plate 1. Thus, as shown in FIG. 10, in the state after the primary base plate 1 and the support base plate 2 are joined together, a gap or distance equivalent to the thickness dimension of the stationary-driving-electrode pad 37 is formed between the connection segment 35 and the support base plate 2 in a region where the stationary-driving-electrode pad 37 is in contact with the connection segment 35 and the support base plate 2, and thereby a certain distortion is generated in a region where the primary base plate 1 and the support base plate 2 are in contact with the stationary-driving-electrode pad 37. If a stress caused by this distortion acts on the detect springs 15, spring characteristics of detect springs 15 can be changed to cause deterioration of the accuracy in detecting the angular velocity. Moreover, the stationary-driving-electrode pad 37 is disposed on one side of the gyro sensor A in the X-direction (lower side in FIG. 9), and thereby a stress arising in the contact region of the stationary-driving-electrode pad 37 acts in an unbalanced manner on the detection springs 15 symmetrically disposed on the gyro sensor in the X-direction to displace the detection mass body 12. This is likely to cause error in detection result of the angular velocity. In the following eighth to ten embodiments, a structure for reducing a stress to be generated in a region where the primary base plate 1 and the support base plate 2 are in contact with the stationary-driving-electrode pad 37 will be described.

Eighth Embodiment

Figure 27:
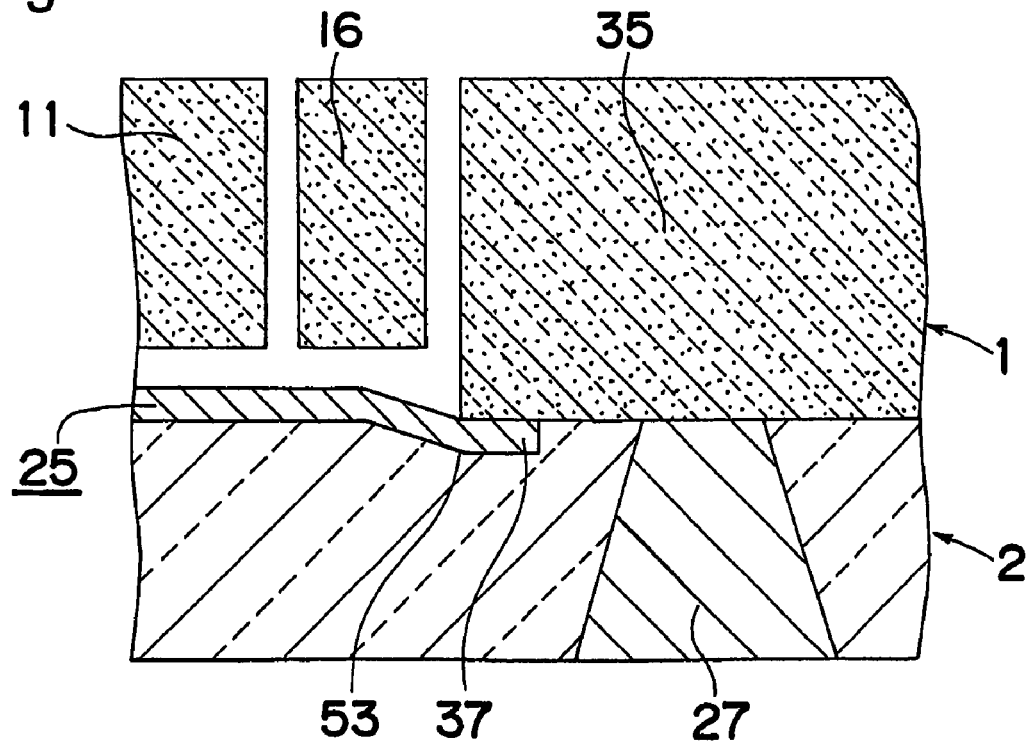
FIG. 27 is a fragmentary sectional view showing a gyro sensor according to an eighth embodiment of the present invention.

A gyro sensor A according to an eighth embodiment of the present invention is based on the gyro sensor A according to the second embodiment, except that a stress-relaxation concave portion 53 (support-base-plate-side stress-relaxation concave portion) is formed in a region of the primary base plate 1 where the stationary-driving-electrode pad 37 is formed, as seen in FIG. 27 showing the region B in FIG. 11A. In the eighth embodiment, the stress-relaxation concave portion 53 is formed to have the same depth as the thickness dimension of the stationary-driving-electrode pad 37, and the stationary-driving-electrode pad 37 is contained in the stress-relaxation concave portion 53 to allow the surface of the stationary-driving-electrode pad 37 and the surface of the support base plate 2 on the both side of the stress-relaxation concave portion 53 to be flush with each other.

According to this structure, as shown in FIG. 27, in the state after the primary base plate 1 and the support base plate 2 are joined together, only a space corresponding to the stress-relaxation concave portion 53 is formed between the connection segment 35 and the primary base plate 1, and the stationary-driving-electrode pad 37 is contained in the space. This eliminates the risk of occurrence of a stress in a region where the primary base plate 1 and the support base plate 2 are in contact with the stationary-driving-electrode pad 37. This provides an effect of being able to maintain adequate accuracy of the gyro sensor A in detecting the angular velocity and prevent occurrence of error in detection result of the angular velocity.

Figure 28:
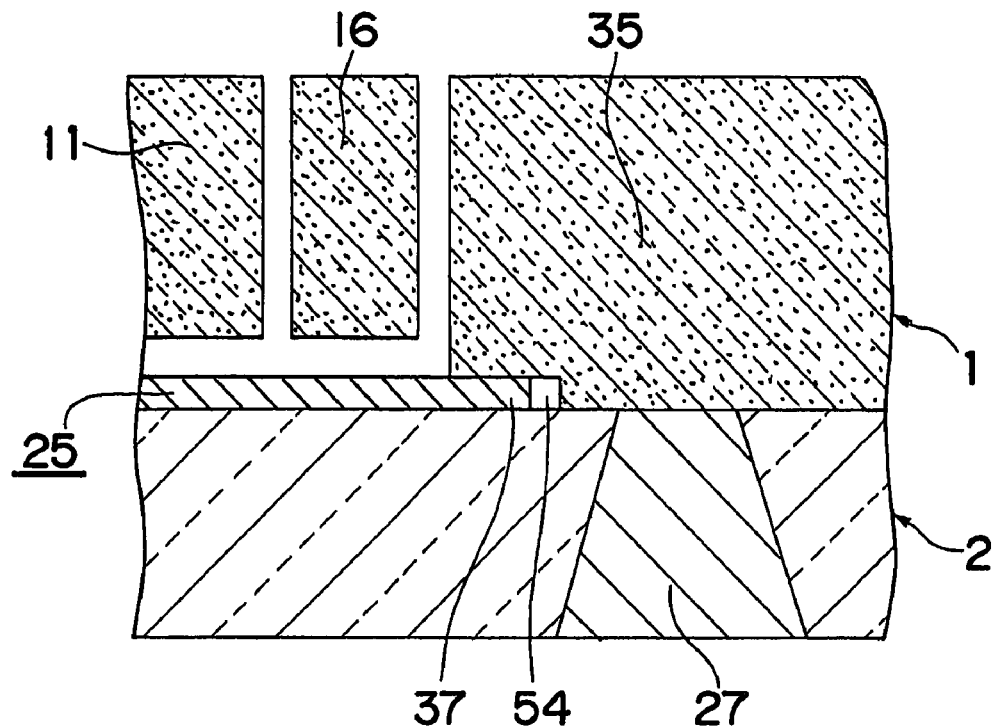
FIG. 28 is a fragmentary sectional view showing a modification of the gyro sensor in FIG. 27.

As shown in FIG. 28, the stress-relaxation concave portion may be formed in the connection segment 35 of the primary base plate 1 instead of the support base plate 2. A stress-relaxation concave portion 54 formed in the primary base plate 1 (primary-base-plate-side stress-relaxation concave portion) is formed to have the same depth as the thickness dimension of the stationary-driving-electrode pad 37. As with the above structure having the stress-relaxation concave portion 53 formed in the support base plate 2, according to this structure, in the state after the primary base plate 1 and the support base plate 2 are joined together, only a space corresponding to the stress-relaxation concave portion 54 is formed between the connection segment 35 and the support base plate 2, and the stationary-driving-electrode pad 37 is contained in the space. That is, the stress-relaxation concave portion 54 formed in the primary base plate 1 also provides an effect of being able to prevent the occurrence of a stress in a region where the primary base plate 1 and the support base plate 2 are in contact with the stationary-driving-electrode pad 37. In this embodiment, the primary base plate 1 formed of a silicon substrate can be processed by an etching process. Thus, when the stress-relaxation concave portion 54 is formed in the connection segment 35, the stress-relaxation concave portion 54 can be readily formed. The remaining structures and functions are the same as those in the second embodiment.

Ninth Embodiment

Figure 29:
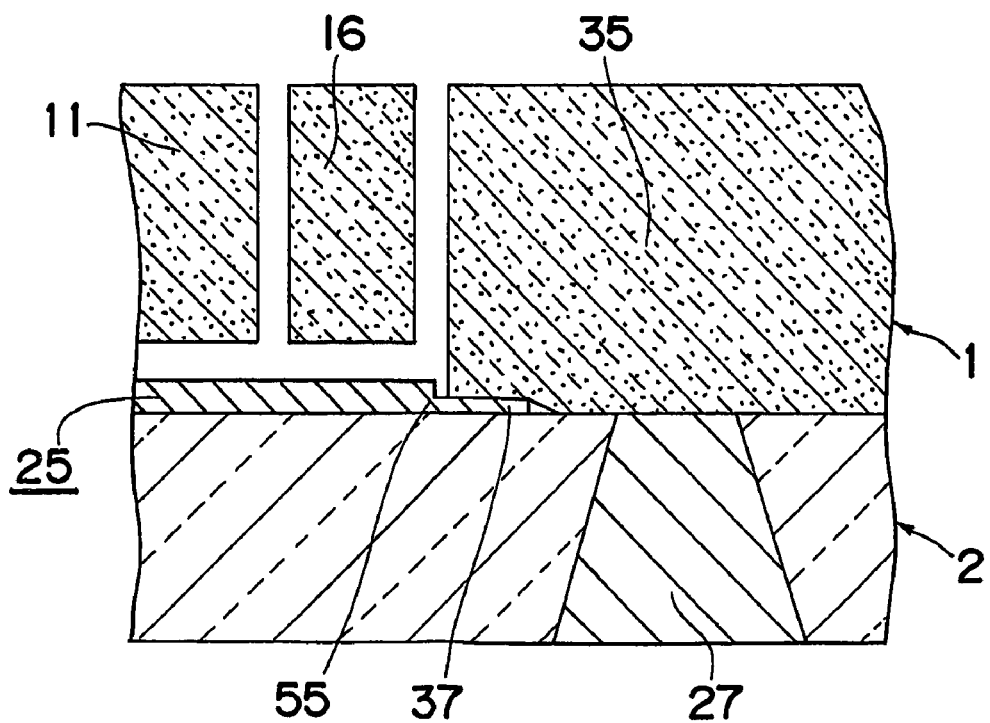
FIG. 29 is a fragmentary sectional view showing a gyro sensor according to a ninth embodiment of the present invention.
Figure 30:
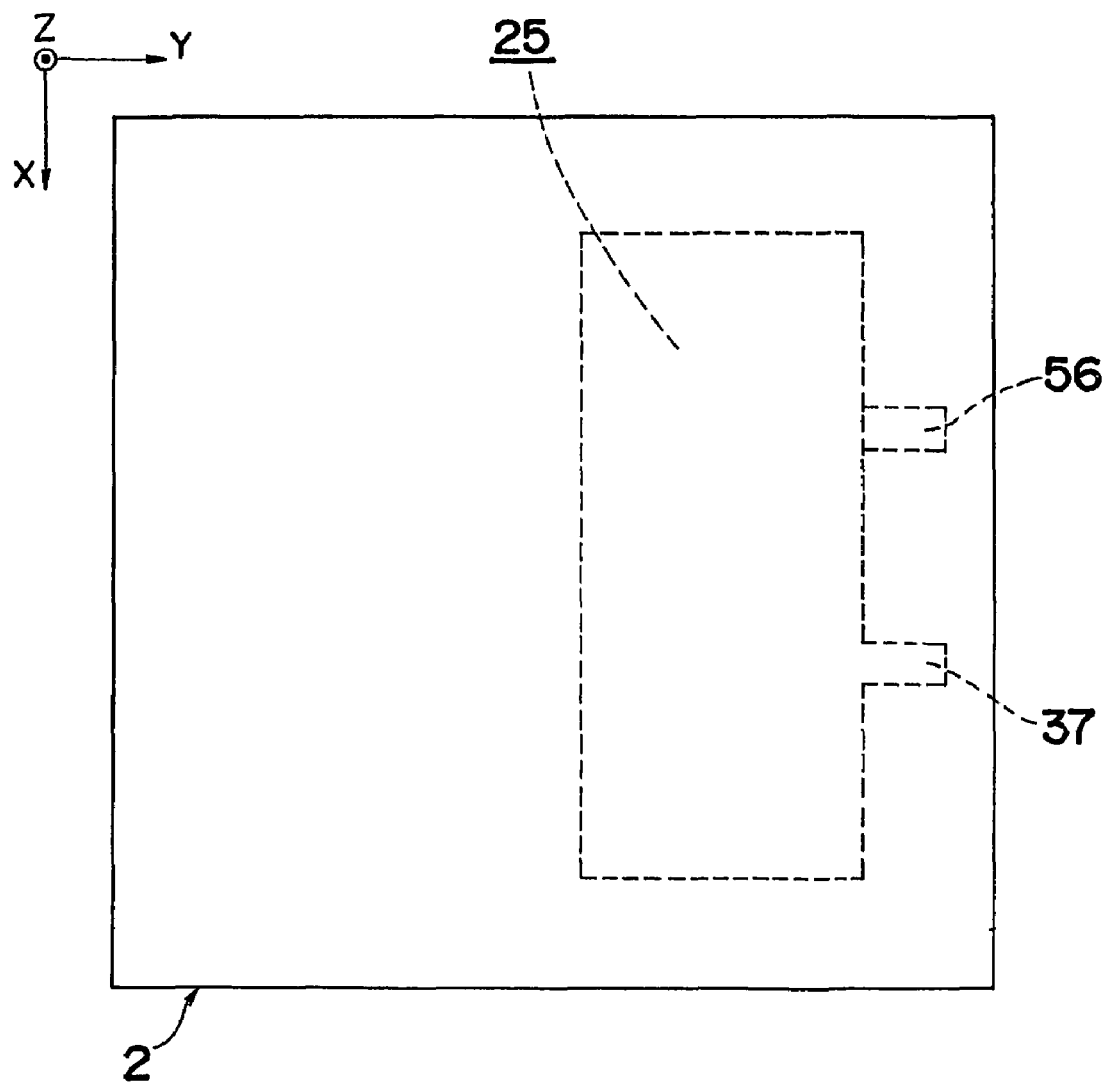
FIG. 30 is a top plan view showing a support base plate for use in the gyro sensor in FIG. 29.
Figure 31:
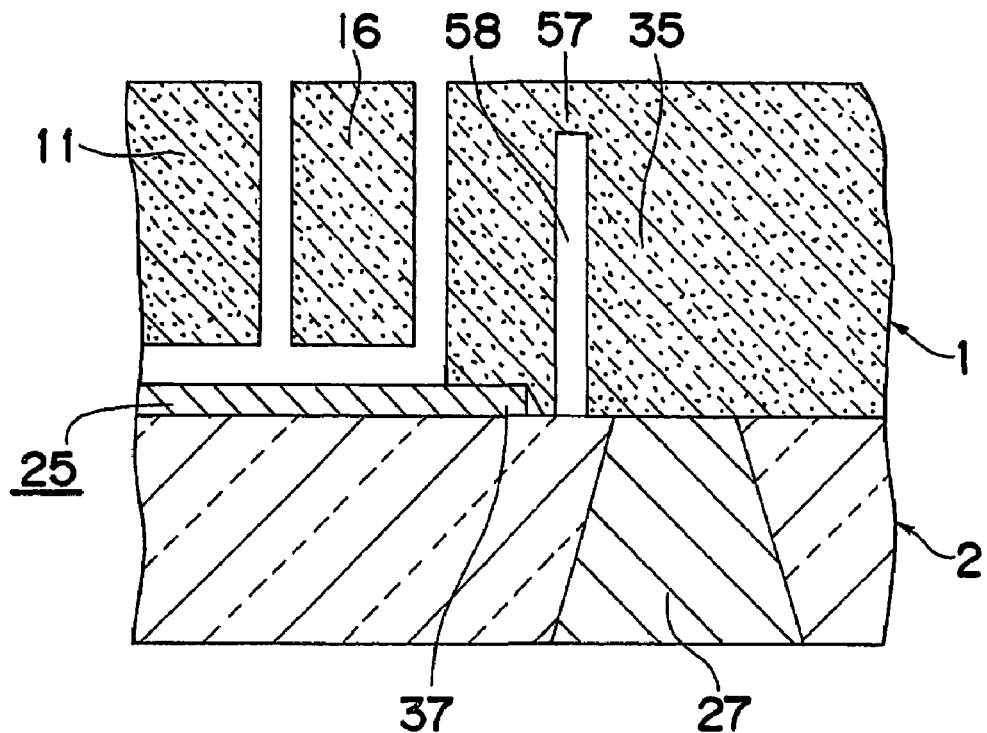
FIG. 31 is a fragmentary sectional view showing a gyro sensor according to a tenth embodiment of the present invention.

A gyro sensor A according to a ninth embodiment of the present invention is based on the gyro sensor A according to the second embodiment, except that as seen in FIG. 29 showing the region B in FIG. 11A, the stationary driving electrode 25 is formed with a step 55 allowing a region of the stationary driving electrode 25 sandwiching between the connection segment 35 and the support base plate 2 to be thinner than the remaining region, in the state after the primary base plate 1 and the support base plate 2 are joined together.

In the ninth embodiment, a region of the stationary driving electrode 25 sandwiching between the connection segment 35 and the support base plate 2 to be thinner than the remaining region, in the state after the primary base plate 1 and the support base plate 2 are joined together. Thus, a stress to be generated in a region where the primary base plate 1 and the support base plate 2 are in contact with the stationary-driving-electrode pad 37 can be reduced to a relatively low value. This provides an effect of being able to maintain adequate accuracy of the gyro sensor A in detecting the angular velocity and prevent occurrence of error in detection result of the angular velocity. The stationary driving electrode 25 formed of a thin film made of conductive metal, such as aluminum, can be processed by an etching process. Thus, the step can be readily formed in the stationary driving electrode 25.

Further, a dummy pad 5 having the same shape as that of the stationary-driving-electrode pad 37 may be formed at a position symmetrical to the stationary-driving-electrode pad 37 in the X-direction, to prevent occurrence of error in detection result of the angular velocity. In addition to the shape in conformity to the plate surface of the support base plate 2, the dummy pad 56 has the same thickness dimension as that of the stationary-driving-electrode pad 37. Thus, when the dummy pad 56 is sandwiched between the primary base plate 1 and the support base plate 2, it provides the same mechanical effect as that to be obtained when the stationary-driving-electrode pad 37 is sandwiched between the primary base plate 1 and the support base plate 2. Specifically, in the state after the primary base plate 1 and the support base plate 2 are joined together, a region where the primary base plate 1 and the support base plate 2 are in contact with the dummy pad 56 has the same distortion as that in a region where they are in contact with the stationary-driving-electrode pad 37. In this case, a stress caused by such a distortion acts on the two detection springs 15 evenly, and thereby there is no risk of occurrence of error in detection result of the angular velocity. The dummy pad 56 may not be electrically connected to the stationary driving electrode 25, or may be electrically connected to the stationary driving electrode 25 to use as a second stationary driving electrode. In latter case, it is desirable that an external circuit is electrically connected to the second stationary driving electrode through the connection segment 35. The remaining structures and functions are the same as those in the second embodiment.

Tenth Embodiment

A gyro sensor A according to a tenth embodiment of the present invention is based on the gyro sensor A according to the second embodiment, except that a stress relaxation spring 57 is formed around a region of the connection segment 35 in contact with the stationary-driving-electrode pad 37, and the region of the connection segment 35 in contact with the stationary-driving-electrode pad 37 is connected to the remaining region of the connection segment 37 through the stress relaxation spring 57.

Specifically, a cut 58 is formed between a first region of the connection segment 35 in contact with the stationary-driving-electrode pad 37 and a second region of the connection segment 35 in contact with an electrode wiring 27, in such as manner as to extend in the thickness direction (Z-direction) and have an opening on the side of the support base plate 2. Further, a region of the connection segment 35 having a thickness dimension less that the remaining region due to presence of the cut 58, serves as the stress relaxation spring 57. Thus, even if the region of the connection segment 35 in contact with the stationary-driving-electrode pad 37 has a distortion, a stress caused by the distortion can be relaxed by the stress relaxation spring 57 formed therearound, and prevented from acting on the detection springs 15. This provides an effect of being able to maintain adequate accuracy of the gyro sensor A in detecting the angular velocity and prevent occurrence of error in detection result of the angular velocity. The remaining structures and functions are the same as those in the second embodiment.

Eleventh Embodiment

Figure 32:
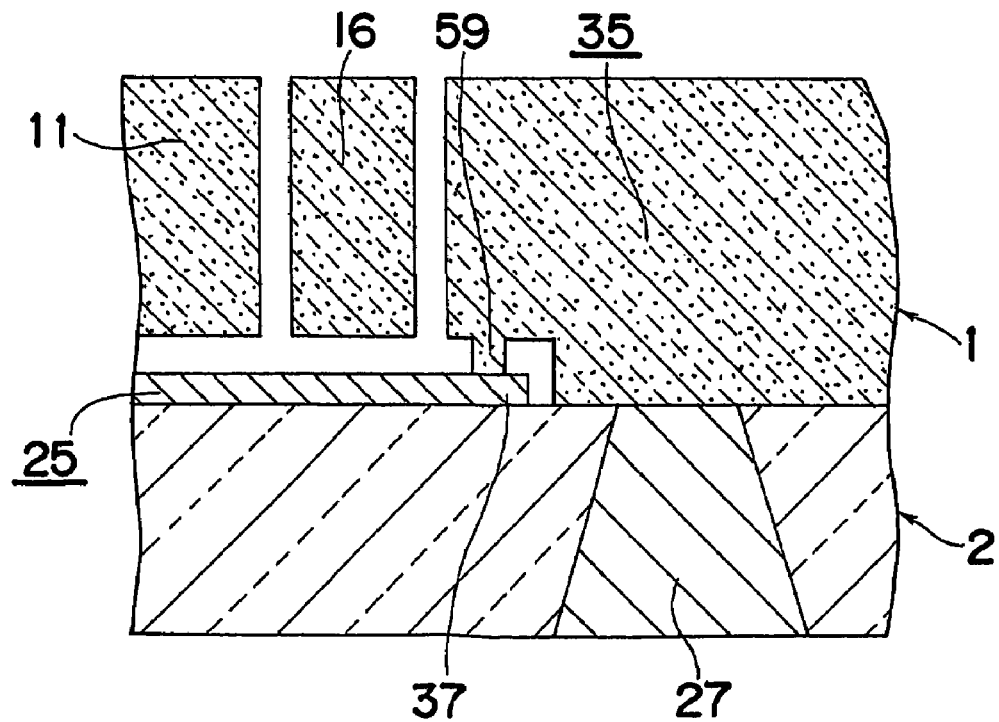
FIG. 32 is a fragmentary sectional view showing a gyro sensor according to an eleventh embodiment of the present invention.

A gyro sensor A according to an eleventh embodiment of the present invention is based on the gyro sensor A according to the second embodiment, and a contact protrusion 59 is provided on a surface of the connection segment 35 opposed to the stationary-driving-electrode pad 37, in such a manner as to protruding from the surface to be in contact with the stationary-driving-electrode pad 37, as seen in FIG. 32 showing the region B in FIG. 11. A gap or space is formed between the stationary-driving-electrode pad 37 and the surrounding of the contact protrusion 59 of the connection segment 35, and the connection segment 35 is in contact with the stationary-driving-electrode pad 37 only through the contact protrusion 59. Further, the contact area between the connection segment 35 and the stationary-driving-electrode pad 37 is set at a given value by adjusting an area of the distal end of the contact protrusion 59 at the given value. Thus, even if a misalignment between the primary base plate 1 and the support base plate 2 occurs during an operation for joining them together, an intended contact area between the connection segment 35 and the stationary-driving electrode 25 will never be changed.

The vibration voltage is applied to the driven mass body 11 and the stationary driving electrode 25 through the connection segment 35 and the stationary-driving electrode 25. Thus, a contact resistance between the connection segment 35 and the stationary-driving electrode 25 is likely to have an influence on the value of the vibration voltage. That is, if a contact resistance between the connection segment 35 and the stationary-driving electrode 25 has variations, an electrostatic force for verbalizing the driven mass body 11 is likely to be varied.

According to the above structure in this embodiment, the contact area between the connection segment 35 and the stationary-driving electrode 25 can be maintained at a constant value. This makes it possible to reduce the variation in contact resistance between the connection segment 35 and the stationary-driving electrode 25 so as to prevent occurrence of variations in value of a vibration voltage in each gyro sensor. Thus, the level of an electrostatic force for vibrating the stationary-driving electrode 25 can be uniformed to provide uniform detection sensitivity to angular velocity.

In the tenth embodiment, a position where the contact protrusion 59 is formed in the connection segment 35 is standardized. Thus, an electric field distribution in the connection segment 35 can be uniformed to prevent variation in electric resistance of the connection segment 35 so as to suppress variation in detection sensitivity to angular velocity. The remaining structures and functions are the same as those in the second embodiment.

Twelfth Embodiment

A gyro sensor A according to a twelfth embodiment of the present invention is based on the gyro sensor A according to the second embodiment, and a region of the stationary-driving-electrode pad 37 to be in contact with the connection segment 35 is regulated to allow a contact area between the connection segment 35 and the stationary-driving electrode 25 to be set at a constant value.

Figure 33:
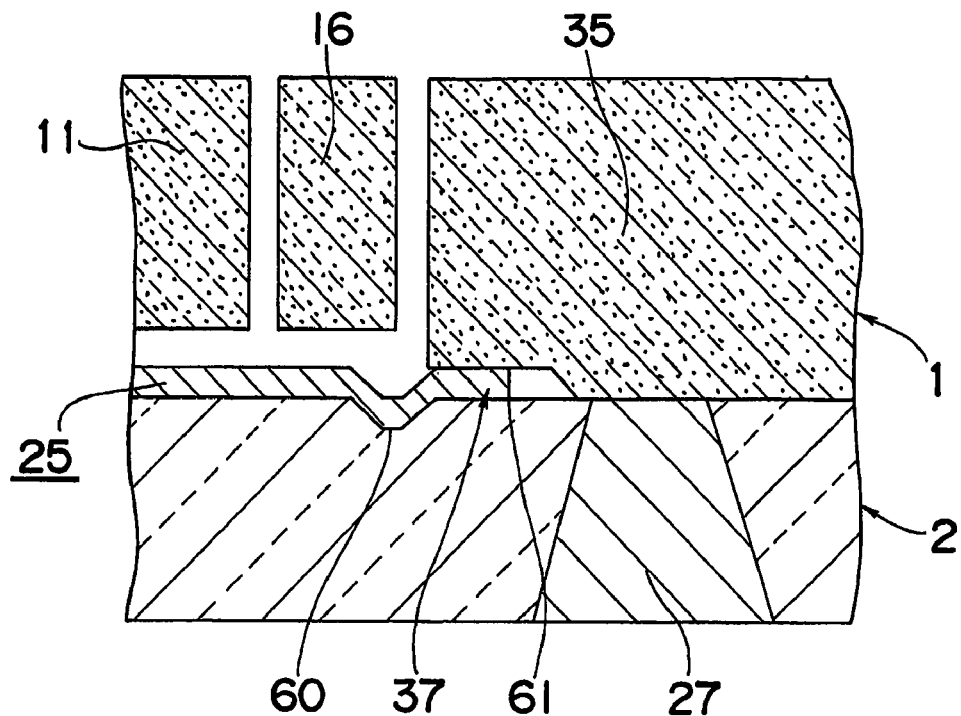
FIG. 33 is a fragmentary sectional view showing a gyro sensor according to a twelfth embodiment of the present invention.

Specifically, as seen in FIG. 33 showing the region B in FIG. 11A, a contact-regulating concave portion 60 is formed around a part (hereinafter referred to as "connection region") of the stationary-driving-electrode pad 37 on the support base plate 2 opposed to the primary base plate 1. The remaining region of the stationary-driving-electrode pad 37 other than connection region 61 is formed within the contact-regulating concave portion 60, and thereby located away from the primary base plate 1 relative to the connection region 61 in the thickness direction of the support base plate 2. Thus, in the stationary-driving electrode 25, only the connection region 61 of the stationary-driving-electrode pad 37 is brought into contact with the connection segment 35. The area of the connection region 61 is determined by the shape and position of the contact-regulating concave portion 60. The position and shape of the contact-regulating concave portion 60 can be standardized to uniform the contact area between the connection segment 35 and the stationary-driving electrode 25. Thus, even if a misalignment between the primary base plate 1 and the support base plate 2 occurs during an operation for joining them together, an intended contact area between the connection segment 35 and the stationary-driving electrode 25 will never be changed.

The vibration voltage is applied to the driven mass body 11 and the stationary driving electrode 25 through the connection segment 35 and the stationary-driving electrode 25. Thus, a contact resistance between the connection segment 35 and the stationary-driving electrode 25 is likely to have an influence on the value of the vibration voltage. That is, if a contact resistance between the connection segment 35 and the stationary-driving electrode 25 has variations, an electrostatic force for verbalizing the driven mass body 11 is likely to be varied.

According to the above structure in this embodiment, the contact area between the connection segment 35 and the stationary-driving electrode 25 can be maintained at a constant value. This makes it possible to reduce the variation in contact resistance between the connection segment 35 and the stationary-driving electrode 25 so as to prevent occurrence of variations in value of a vibration voltage in each gyro sensor. Thus, the level of an electrostatic force for vibrating the stationary-driving electrode 25 can be uniformed to provide uniform detection sensitivity to angular velocity.

Figure 34:
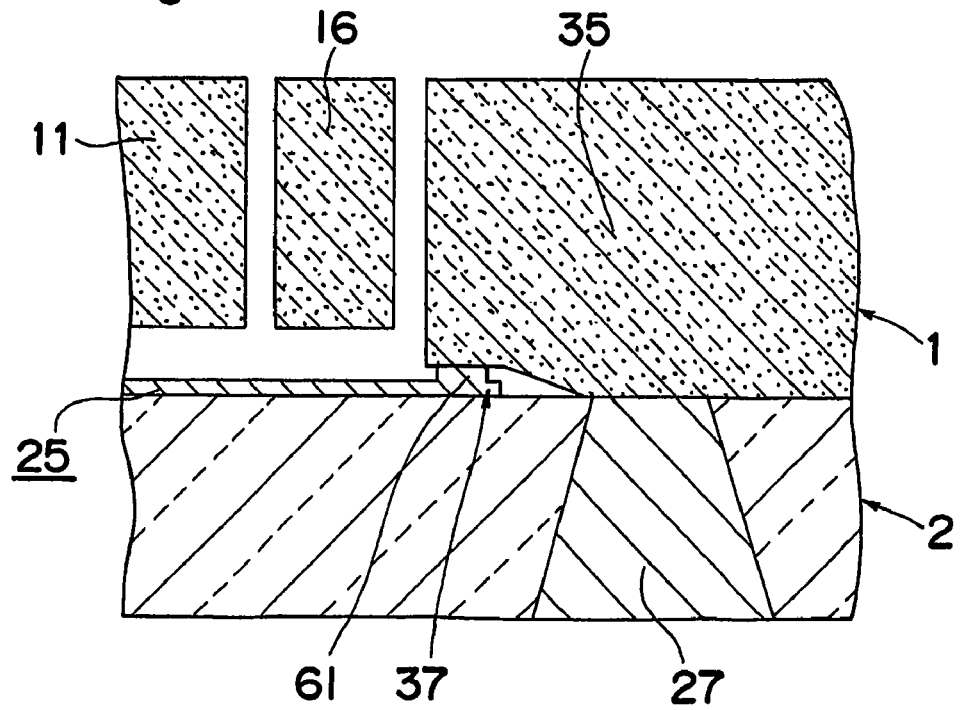
FIG. 34 is a fragmentary sectional view showing a modification of the gyro sensor in FIG. 33.
Figure 35:
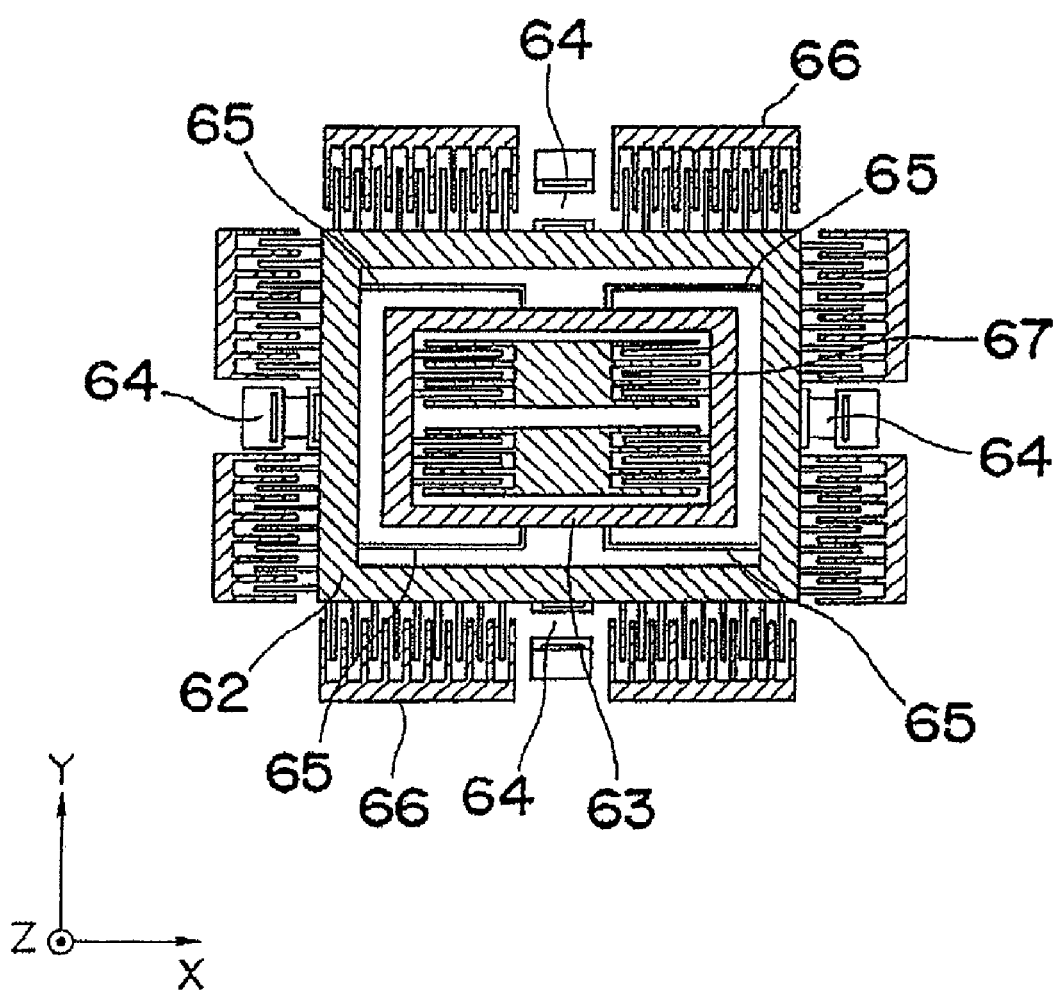
FIG. 35 is a top plan view showing one example of a conventional gyro sensor.

Instead of the above structure where the contact-regulating concave portion 60 is formed on the support base plate 2, the thickness of the stationary-driving electrode 25 may be changed in two-step manner, to provide a larger thickness dimension of the connection region 61 in the stationary-driving-electrode pad 37, as compared to the remaining region, as seen in FIG. 34 showing the region B in FIG. 11A. In the structure of FIG. 34, the connection region 61 protrudes in the thickness dimension of the support base plate 2 in a greater height than that of the remaining region of the stationary-driving electrode 25. Thus, in the stationary-driving electrode 25, only the connection region 61 of the stationary-driving electrode 25 is brought into contact with the connection segment 35. The stationary driving electrode 25 formed of a thin film made of conductive metal, such as aluminum, can be processed by an etching process. Thus, a process for forming the connection region 61 in such a manner as to change the thickness dimension in a two-step manner can be readily formed in the stationary driving electrode 25. The remaining structures and functions are the same as those in the second embodiment.

While the present invention has been described in conjunction with specific embodiments thereof, various modifications and alterations will become apparent to those skilled in the art. Therefore, it is intended that the present invention is not limited to the illustrative embodiments herein, but only by the appended claims and their equivalents.

INDUSTRIAL APPLICABILITY

As mentioned above, the gyro sensor or the sensor apparatus of the present invention is useful, particularly, in detecting a Coriolis force, and suitable as an angular velocity sensor for use in a suspension control system for automobiles, an inertial navigation system for airplanes and a blurring-correcting apparatus for cameras.

The invention claimed is:

1. A gyro sensor comprising a primary base plate formed of a semiconductor substrate and provided with a detection mass body, a driven mass body and a detecting element, said detection mass body being displaceably supported relative to a support base plate in a plane along said support base plate through at least two detection springs having one end fixed to said support base plate, said driven mass body being connected to said detection mass body through a drive spring and configured to vibrate in a direction intersecting said support base plate, said detecting element configured to detect a displacement amount of said detection mass body in the plane along said support base plate, wherein said detection spring extends from said detection mass body in only one direction along said support base plate so as to support said detection mass body relative to said support base plate in a cantilever manner, the at least two detection springs each extending from said detection mass body in said only one direction and having flexibility in a displacement direction of said detection mass body, wherein respective distal ends of said at least two detection springs are connected to one another continuously and integrally through a coupling segment, said coupling segment having an intermediate portion fixed to said support base plate.

2. The gyro sensor according to claim 1, wherein said driven mass body and said detection mass body are disposed parallel to one another, and said drive spring is disposed between said driven mass body and said detection mass body and formed as a torsionally deformable torsion spring.

3. The gyro sensor according to claim 1, wherein either one of said driven mass body and said support base plate has a driven-mass-body-protecting protrusion provided in a protruding manner thereon to regulate a maximum vibrational amplitude of said driven mass body.

4. The gyro sensor according to claim 1, wherein said detecting element includes a plurality of movable comb-tooth segments each provided in a protruding manner on an inner peripheral surface of a cutout hole formed in said detection mass body, and a plurality of stationary comb-tooth segments each provided in a protruding manner on an outer peripheral surface of a stationary member disposed within said cutout hole and in opposed relation to a corresponding one of said plurality of movable comb-tooth segments.

5. The gyro sensor according to claim 4, wherein said detecting element is adapted to detect the displacement amount of said detection mass body in accordance with change in electrostatic capacitance between said plurality of movable comb-tooth segments and said plurality of stationary comb-tooth segments, said detecting element including a capacitance-adjusting electrode which is disposed in opposed relation to said detection mass body in the displacement direction of said detection mass body, and adapted to adjust an electrostatic capacitance value between said plurality of movable comb-tooth segments and said plurality of stationary comb-tooth segments by means of an electrostatic force to be generated between said capacitance-adjusting electrode and said detection mass body in response to a voltage applied therebetween.

6. The gyro sensor according to claim 1, which includes a stationary driving electrode which is disposed on a surface of said support base plate opposed to said driven mass body, and adapted to vibrate said driven mass body by means of an electrostatic force to be generated between said driven mass body and said stationary driving electrode in response to a vibration voltage applied therebetween.

7. The gyro sensor according to claim 1, which includes a stationary driving electrode which is disposed on a surface of said support base plate opposed to said driven mass body in such a manner that said stationary driving electrode is divided into two pieces at an intermediate position of said surface in the displacement direction of said detection mass body, and adapted to vibrate said driven mass body by means of electrostatic forces to be generated between said driven mass body and respective ones of said divided pieces in response to two types of vibration voltages applied, respectively, therebetween, said vibration voltages having opposite polarities and the same absolute value.

8. The gyro sensor according to claim 6, which includes a distance-adjusting electrode which is disposed on the surface of said support base plate opposed to said driven mass body and in adjacent relation to said stationary driving electrode, and adapted to adjust a distance between said driven mass body and said stationary driving electrode by means of an electrostatic force to be generated between said driven mass body and said stationary driving electrode in response to a voltage applied therebetween.

9. The gyro sensor according to claim 6, wherein said stationary driving electrode is formed on said support base plate except for a region thereof opposed to a region of said driven mass body where a vibrational amplitude is to be maximized.

10. The gyro sensor according to claim 6, wherein said stationary driving electrode is disposed on the surface of said support base plate opposed to said driven mass body, wherein said stationary driving electrode and an electrode wiring are concurrently in contact with said primary base plate and electrically connected to one another through said primary base plate joined to said support base plate.

11. The gyro sensor according to claim 1, wherein said driven mass body has a thickness dimension greater than that of said detection mass body.

12. The gyro sensor according to claim 1, wherein said driven mass body has a through-hole penetrating therethrough in a vibration direction thereof.

13. The gyro sensor according to claim 1, wherein said primary base plate is provided with a frame fixed to said support base plate in such a manner as to surround around said driven mass body and said detection mass body, and either one of said detection mass body and said frame has a detection-mass-body-protecting protrusion provided in a protruding manner thereon to regulate a maximum displacement amount of said detection mass body.

14. The gyro sensor according to claim 1, wherein said primary base plate is provided with an acceleration-detecting electrode which is disposed in a plane along said support base plate and in opposed relation to said driven mass body with a given distance in a direction orthogonal to the displacement direction of said detection mass body, said acceleration-detecting electrode being operable in cooperation with said driven mass body to serve as an acceleration detector for detecting a displacement amount of said driven mass body in the direction orthogonal to the displacement direction of said detection mass body in the plane along said support base plate.

15. A sensor apparatus comprising two of the gyro sensor as defined in claim 1, and a signal processing section adapted to drive said gyro sensor in such a manner that the respective driven mass bodies of said two gyro sensor are vibrated in opposite directions, and to output a difference between respective outputs of said gyro sensors.

* * * * *